United States Patent
Calman et al.

(10) Patent No.: US 9,754,320 B2
(45) Date of Patent: *Sep. 5, 2017

(54) PROVIDING A RECORD OF AN INTERACTIVE CONFERENCE

(71) Applicant: Bank of America Corporation, Charlotte, NC (US)

(72) Inventors: Matthew A. Calman, Charlotte, NC (US); Rajat Agrawal, Sunnyvale, CA (US); Wanwen Han, Jersey City, NJ (US); Alicia C. Jones, Fort Mill, SC (US); Su Liu, Pittsburgh, PA (US); Cameron Jungeun Park-Hur, Castro Valley, CA (US); Nir Rachmel, Brookline, MA (US); Lynn Streja, Pittsburgh, PA (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 886 days.

This patent is subject to a terminal disclaimer.

(21) Appl. No.: 13/652,120

(22) Filed: Oct. 15, 2012

(65) Prior Publication Data

US 2014/0108288 A1    Apr. 17, 2014

(51) Int. Cl.
G06Q 40/02 (2012.01)
H04N 7/15 (2006.01)
H04N 5/765 (2006.01)

(52) U.S. Cl.
CPC ............ *G06Q 40/02* (2013.01); *H04N 7/155* (2013.01)

(58) Field of Classification Search
CPC combination set(s) only.
See application file for complete search history.

(56) References Cited

U.S. PATENT DOCUMENTS

| 4,650,929 A | 3/1987 | Boerger et al. |
| 5,604,341 A | 2/1997 | Grossi et al. |

(Continued)

FOREIGN PATENT DOCUMENTS

KR    2008023900 A    3/2008

OTHER PUBLICATIONS iVisit, iVisit Presenter, iVisit Video Conferencing & Collaboration Solutions for Mobile and Desktop, http://www.ivisit.com/products_presenter.php,accessed Mar. 26, 2013, 3 pgs.

(Continued)

*Primary Examiner* — Mark A Fleischer
(74) *Attorney, Agent, or Firm* — Michael A. Springs; Moore & Van Allen PLLC; Peter B. Stewart

(57) ABSTRACT

Embodiments of the invention are directed to systems, methods, and computer program products for providing a record of an interactive conference, such as a video conference. The systems, methods, and computer program products determine that an operative connection has been established between a user device of a user and a system associated with a representative of a financial institution, such that the user and the representative are conducting a conference; identify a document referenced during the conference; capture at least a portion of the conference in a record; associate the document with the record; and store the record. Customers of financial institutions desire to have records of their interactions with representatives of the financial institution and the embodiments of this invention assist the customer in maintaining and organizing those records.

18 Claims, 14 Drawing Sheets

(56) References Cited

U.S. PATENT DOCUMENTS

| | | |
|---|---|---|
| 5,774,663 A | 6/1998 | Randle et al. |
| 5,825,869 A | 10/1998 | Brooks et al. |
| 6,223,983 B1 | 5/2001 | Kjonaas et al. |
| 6,301,354 B1 | 10/2001 | Walker et al. |
| 6,430,174 B1 | 8/2002 | Jennings et al. |
| 6,654,032 B1 | 11/2003 | Zhu et al. |
| 6,820,260 B1 | 11/2004 | Flockhart et al. |
| 6,845,155 B2 | 1/2005 | Elsey |
| 6,847,714 B2 | 1/2005 | Das et al. |
| 7,167,182 B2 | 1/2007 | Butler |
| 7,372,952 B1 | 5/2008 | Wu et al. |
| 7,679,636 B1 | 3/2010 | Beck et al. |
| 7,742,584 B2 | 6/2010 | Chatterjee et al. |
| 7,869,583 B2 | 1/2011 | Mandalia et al. |
| 8,255,304 B1 | 8/2012 | Lorenzo |
| 8,630,854 B2 * | 1/2014 | Marvit ............... G10L 15/26 348/14.08 |
| 8,713,454 B2 | 4/2014 | Sriraghavan et al. |
| 8,866,877 B2 | 10/2014 | Calman et al. |
| 8,866,878 B2 | 10/2014 | Calman et al. |
| 8,867,734 B2 | 10/2014 | Calman et al. |
| 8,902,279 B2 | 12/2014 | Calman et al. |
| 8,942,684 B2 | 1/2015 | Calman et al. |
| 9,001,180 B2 | 4/2015 | Calman et al. |
| 2002/0172347 A1 | 11/2002 | Elsey |
| 2003/0035531 A1 | 2/2003 | Brown et al. |
| 2003/0202088 A1 | 10/2003 | Knight |
| 2004/0203677 A1 | 10/2004 | Brown et al. |
| 2005/0100160 A1 | 5/2005 | Bae |
| 2006/0004660 A1 | 1/2006 | Pranger |
| 2006/0062376 A1 | 3/2006 | Pickford |
| 2006/0256954 A1 | 11/2006 | Patel et al. |
| 2006/0271450 A1 | 11/2006 | Cohen et al. |
| 2007/0016796 A1 | 1/2007 | Singhal |
| 2007/0033528 A1 * | 2/2007 | Merril ............... G02B 26/0816 715/732 |
| 2007/0039025 A1 | 2/2007 | Kraft et al. |
| 2008/0186377 A1 | 8/2008 | Eriksson et al. |
| 2008/0209516 A1 | 8/2008 | Nassiri |
| 2008/0309617 A1 | 12/2008 | Kong et al. |
| 2009/0016512 A1 | 1/2009 | Bryant |
| 2009/0061831 A1 | 3/2009 | Shastry |
| 2009/0089683 A1 | 4/2009 | Thapa |
| 2009/0106155 A1 | 4/2009 | Castellanos et al. |
| 2009/0192845 A1 | 7/2009 | Gudipaty et al. |
| 2009/0193342 A1 | 7/2009 | Barthelmess et al. |
| 2009/0292583 A1 | 11/2009 | Eilam et al. |
| 2010/0066805 A1 | 3/2010 | Tucker et al. |
| 2010/0131868 A1 | 5/2010 | Chawla et al. |
| 2010/0174678 A1 | 7/2010 | Massand |
| 2010/0274859 A1 | 10/2010 | Bucuk |
| 2010/0281129 A1 | 11/2010 | Cha |
| 2011/0026114 A1 | 2/2011 | Abe et al. |
| 2011/0109715 A1 | 5/2011 | Jing et al. |
| 2011/0167123 A1 | 7/2011 | Coskun et al. |
| 2011/0206198 A1 * | 8/2011 | Freedman ............ G06Q 30/06 379/265.03 |
| 2011/0249081 A1 | 10/2011 | Kay et al. |
| 2011/0261947 A1 | 10/2011 | Benefield et al. |
| 2011/0271209 A1 | 11/2011 | Jones et al. |
| 2011/0279638 A1 | 11/2011 | Periyannan et al. |
| 2011/0302503 A1 | 12/2011 | Cahill et al. |
| 2012/0005599 A1 | 1/2012 | Bastide et al. |
| 2012/0072340 A1 | 3/2012 | Amron |
| 2012/0170728 A1 | 7/2012 | Wengrovitz et al. |
| 2012/0179982 A1 | 7/2012 | Gandhi et al. |
| 2012/0206561 A1 | 8/2012 | Huang |
| 2012/0221464 A1 | 8/2012 | Pasquero et al. |
| 2012/0289213 A1 | 11/2012 | Levien et al. |
| 2012/0300014 A1 | 11/2012 | Krantz |
| 2013/0024418 A1 * | 1/2013 | Sitrick ............... G06F 17/241 707/608 |
| 2013/0145284 A1 | 6/2013 | Anantharaman et al. |
| 2013/0297705 A1 | 11/2013 | Arora et al. |
| 2014/0025448 A1 | 1/2014 | Maxfield, IV et al. |
| 2014/0029745 A1 | 1/2014 | Lyman |
| 2014/0033067 A1 | 1/2014 | Pittenger et al. |
| 2014/0108288 A1 | 4/2014 | Calman et al. |
| 2014/0108557 A1 | 4/2014 | Calman et al. |

OTHER PUBLICATIONS

International Search Report and Written Opinion dated Aug. 2, 2011 for International Patent Application No. PCT/US2011/033901 filed Apr. 26, 2011.

IPRP and Written Opinion dated Oct. 30, 2012 for International Application No. PCT/US2011/033901 filed Apr. 26, 2011.

* cited by examiner

PROVIDING A RECORD OF AN INTERACTIVE CONFERENCE

BACKGROUND

In some circumstances, a customer may desire to speak with or ask a question of a representative of a financial institution. Currently, the customer must go to a banking facility, speak with the representative over the phone, or chat with the representative via text based communications. All of these methods have limitations including inconvenience, lack of ability to view documents or the other party, and non-intuitive communication. Further, these methods do not automatically provide a comprehensive and/or augmented record of the interaction between the representative and the customer. Thus, there is a need for a system providing a record of an interactive conference.

BRIEF SUMMARY

Embodiments of the invention are directed to systems, methods and computer program products for providing a record of an interactive conference. An interactive conference system allows a customer or other individual to receive improved service from a financial institution. In many embodiments, the user desires to have a record of the interactive conference. The record reassures the user that topics discussed during the conference can be reviewed at a later date. In some embodiments, the record is easily searchable, provided to the user, stored by the financial institution, and/or contains links and copies of documents discussed during the conference. The record also allows the user to review the conference to determine whether any errors were made and, if necessary, correct those errors.

In an aspect, a system for providing a record of an interactive conference is provided. In an embodiment, the system includes a memory; a processor; and a computing module stored in the memory, executable by the processor, and configured to cause the processor to perform an action. The action may be to determine that an operative connection has been established between a user device of a user and a system associated with a representative of a financial institution, such that the user and the representative are conducting a conference; identify a document referenced during the conference; capture at least a portion of the conference in a record; associate the document with the record; and store the record.

In an embodiment, the computing module is further configured to cause the processor to provide the record to the user. In some embodiments, the computing module is further configured to cause the processor receive an edit to the record from at least one of the user and the representative. In an embodiment, the computing module is further configured to cause the computer processor to populate the edit to the record to all existing copies of the record. The edit may be selected from the group consisting of an annotation, a voice note, a text note, a tag, and a link. In some embodiments, the computing module is further configured to cause the processor to transcribe audio in the conference into a text transcription, wherein the text transcription is stored in the record. In a still further embodiment, the computing module is further configured to cause the processor to convert the document into searchable text, wherein the searchable text is included in the record.

In another aspect, a method for providing a record of an interactive conference is provided. In an embodiment, the method includes providing a processor for executing computer program code stored in a non-transitory computer-readable medium to cause the processor to: determine that an operative connection has been established between a user device of a user and a system associated with a representative of a financial institution, such that the user and the representative are conducting a conference; identify a document referenced during the conference; capture at least a portion of the conference in a record; associate the document with the record; and store the record.

In some embodiments, the computer program code is further configured to cause the processor to provide the record to the user. In further embodiments, the computer program code is further configured to cause the processor to receive an edit to the record from at least one of the user and the representative. The computer program code may be further configured to cause the processor to populate the edit to the record to all existing copies of the record. The edit may be selected from the group consisting of an annotation, a voice note, a text note, a tag, and a link. In some embodiments, the computer program code is further configured to cause the processor to transcribe audio in the conference into a text transcription, wherein the text transcription is stored in the record. In a still further embodiment, the computer program code is further configured to cause the processor to convert the document into searchable text, wherein the searchable text is included in the record.

In a further aspect, a computer program product for providing a record of an interactive conference is provided. In an embodiment, the computer program product includes a non-transitory computer-readable medium comprising a set of codes for causing a computer to: determine that an operative connection has been established between a user device of a user and a system associated with a representative of a financial institution, such that the user and the representative are conducting a conference; identify a document referenced during the conference; capture at least a portion of the conference in a record; associate the document with the record; and store the record.

In some embodiments, the non-transitory computer-readable medium further comprises a set of codes for causing a computer to provide the record to the user. In an embodiment, the non-transitory computer-readable medium further comprises a set of codes for causing a computer to receive an edit to the record from at least one of the user and the representative. In a further embodiment, the non-transitory computer-readable medium further comprises a set of codes for causing a computer to populate the edit to the record to all existing copies of the record. The non-transitory computer-readable medium may further comprises a set of codes for causing a computer to transcribe audio in the conference into a text transcription, wherein the text transcription is stored in the record. In a still further embodiment, the non-transitory computer-readable medium further comprises a set of codes for causing a computer to convert the document into searchable text, wherein the searchable text is included in the record.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
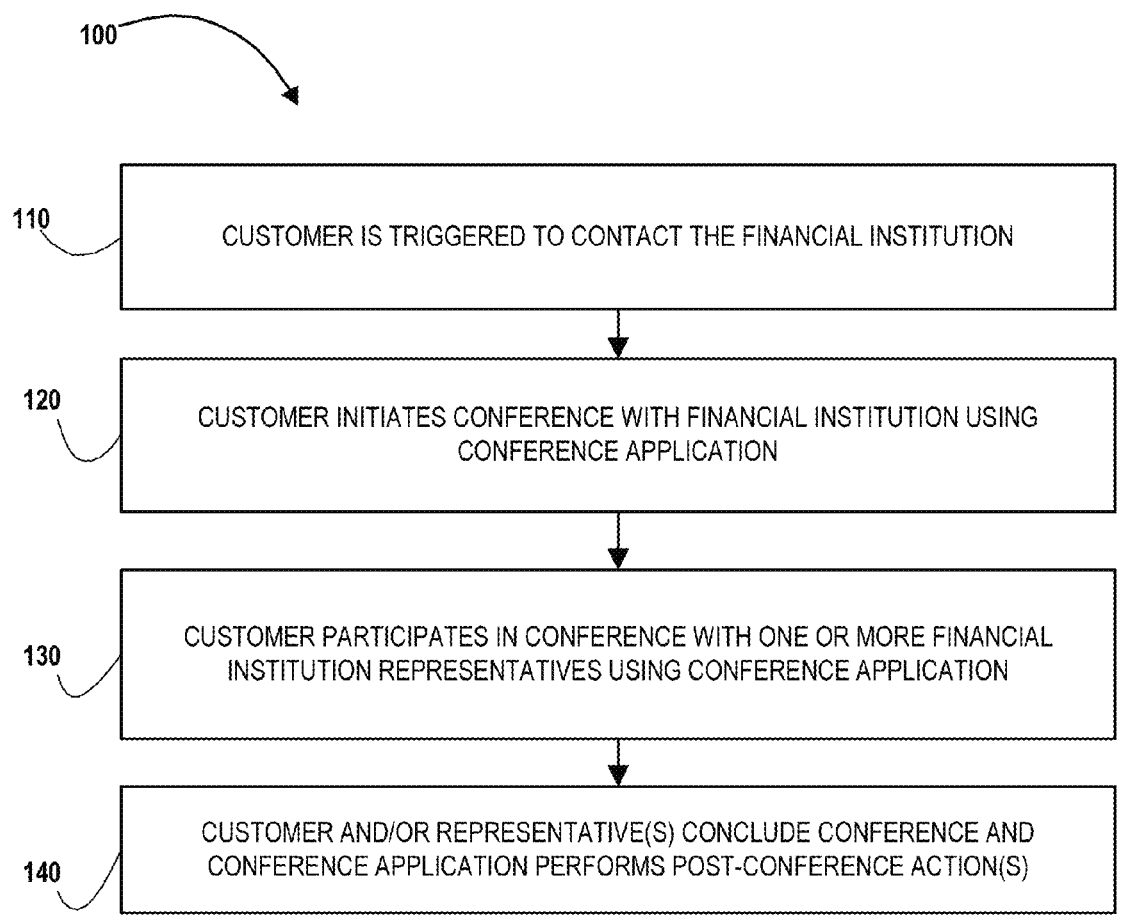
Figure 2:
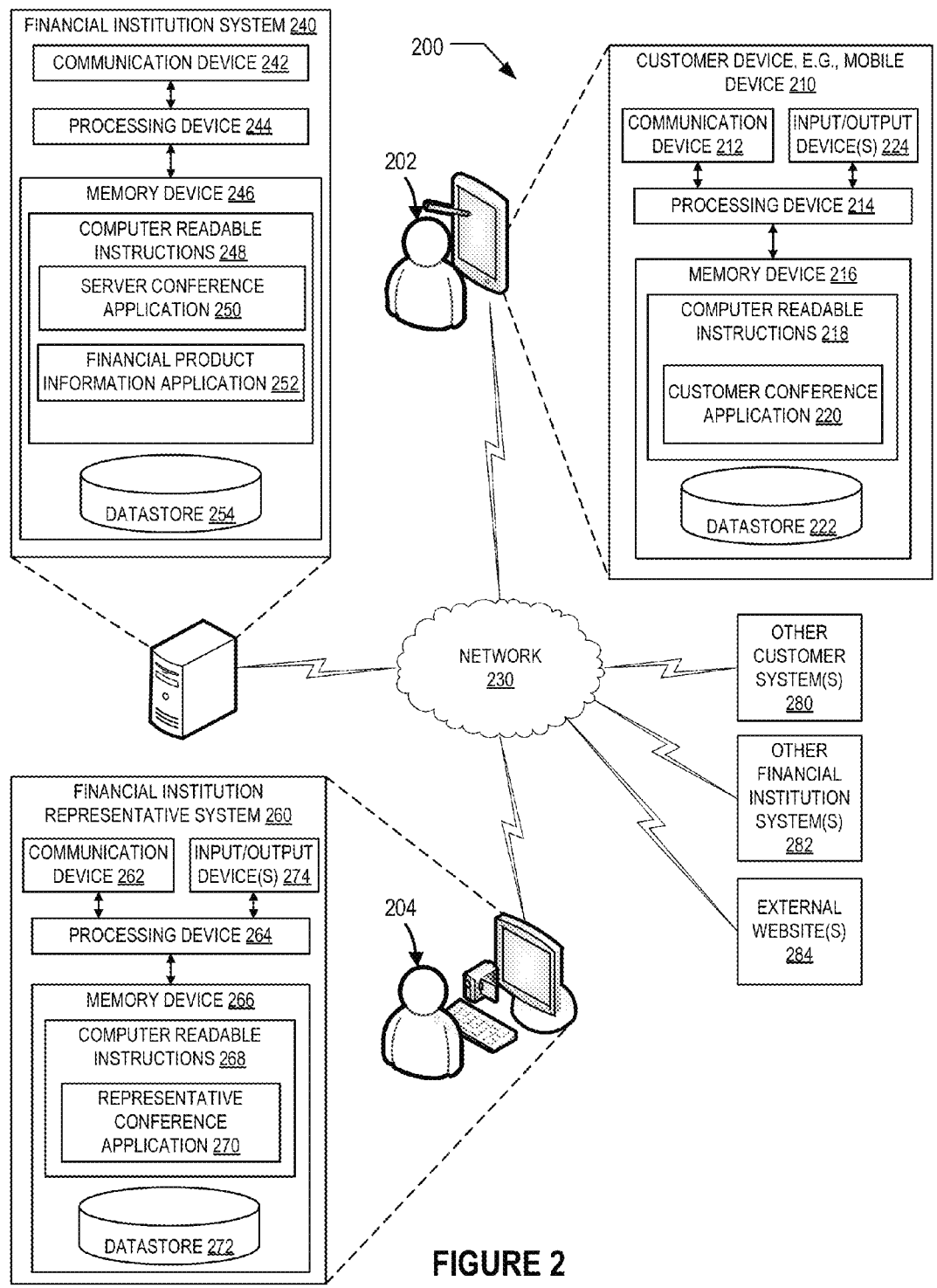
Figure 3:
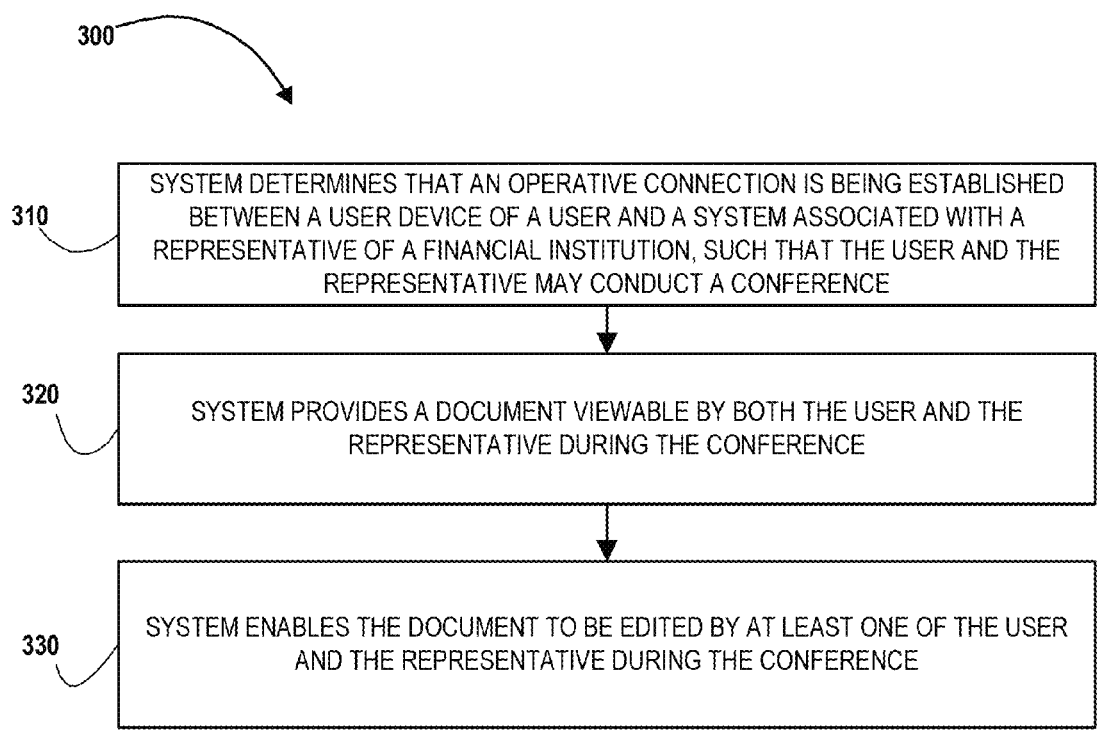
Figure 4:
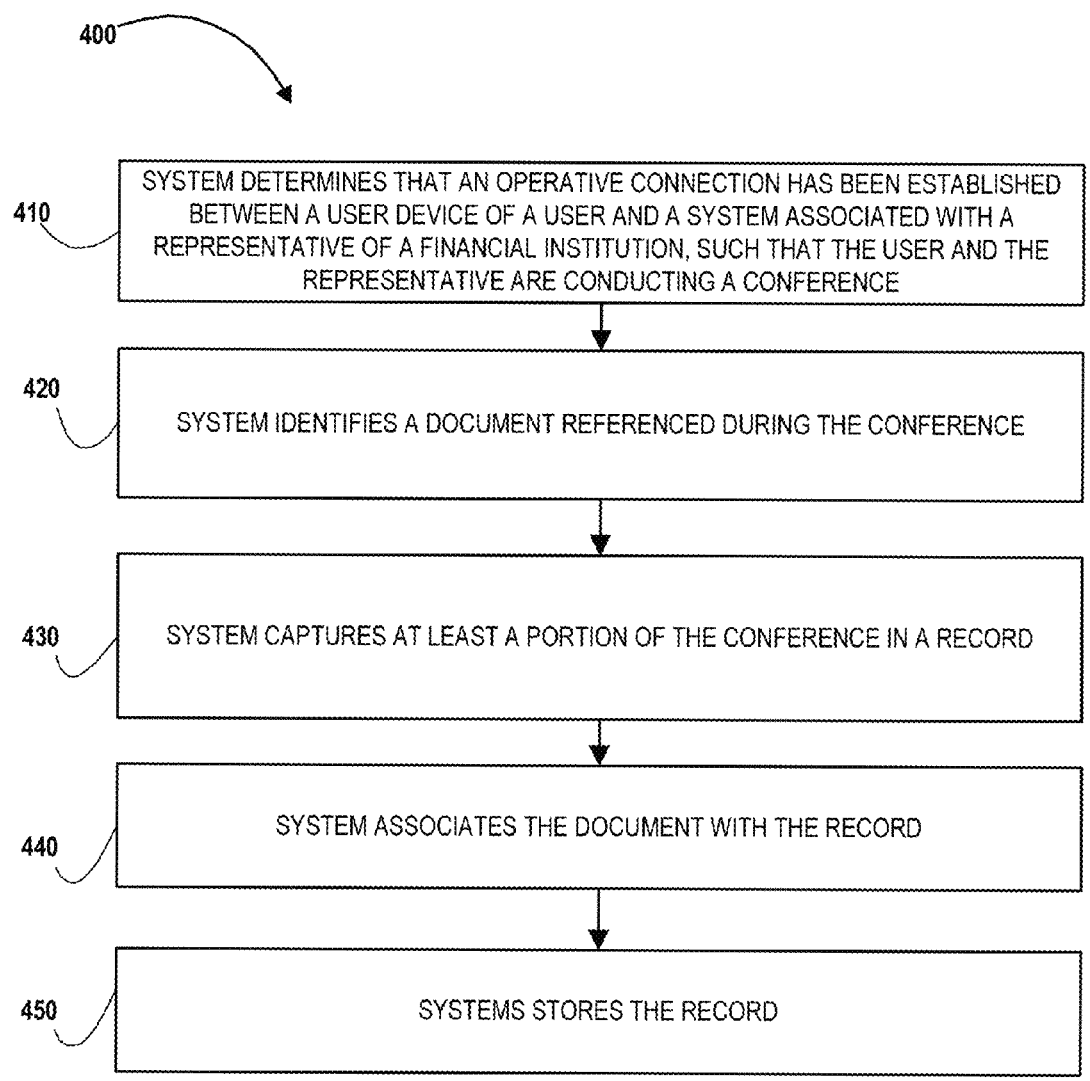
Figure 5:
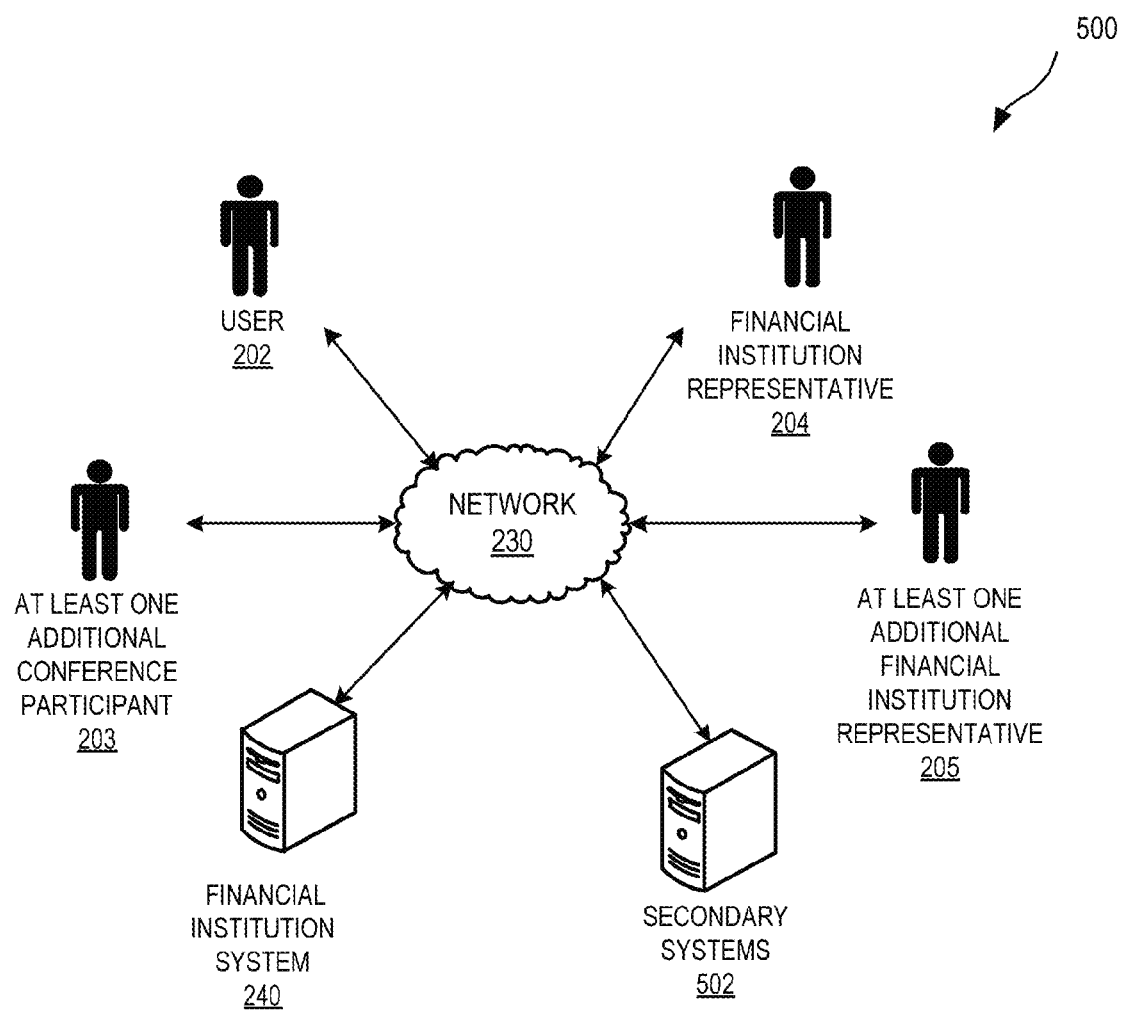
Figure 6A:
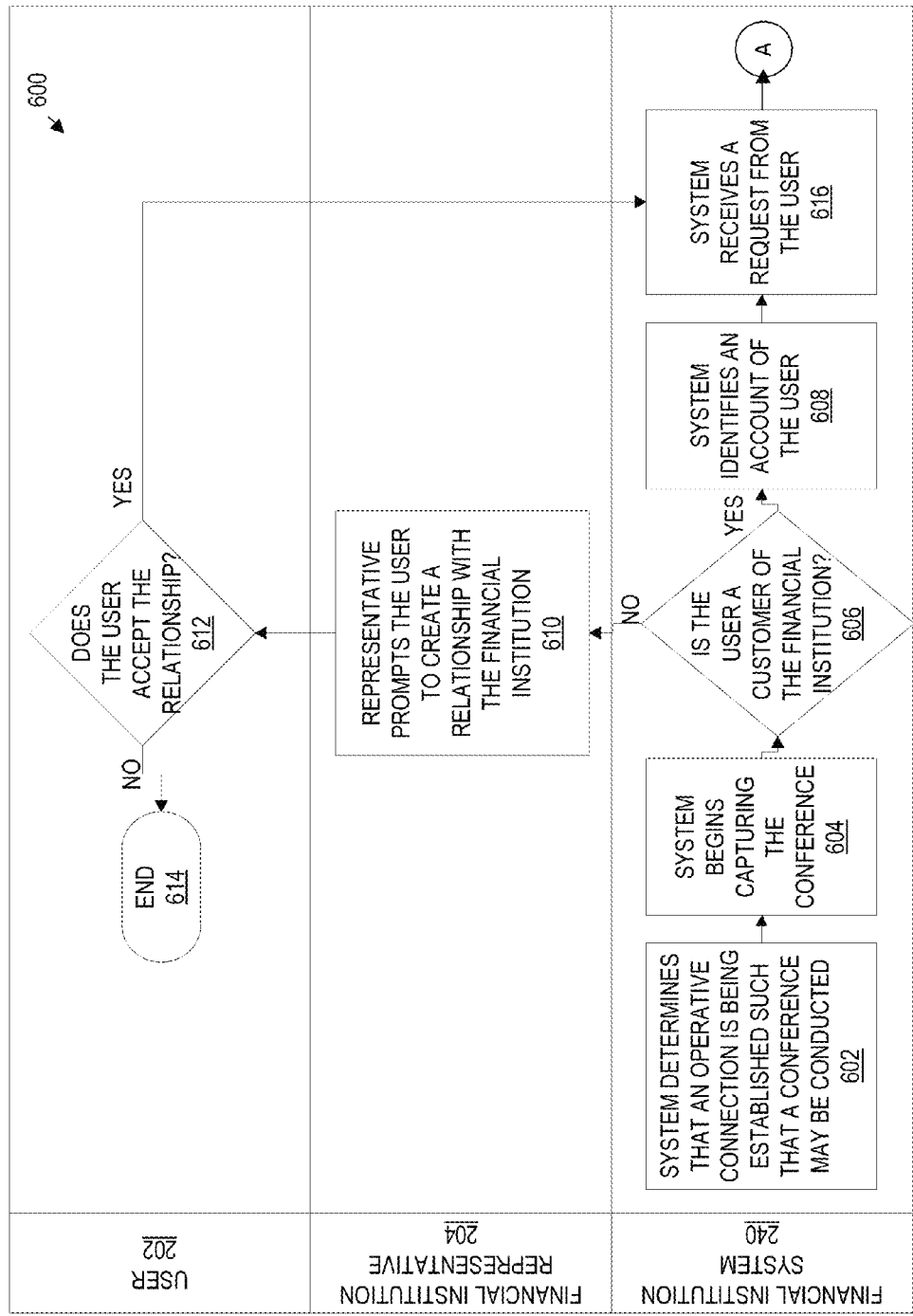
Figure 6B:
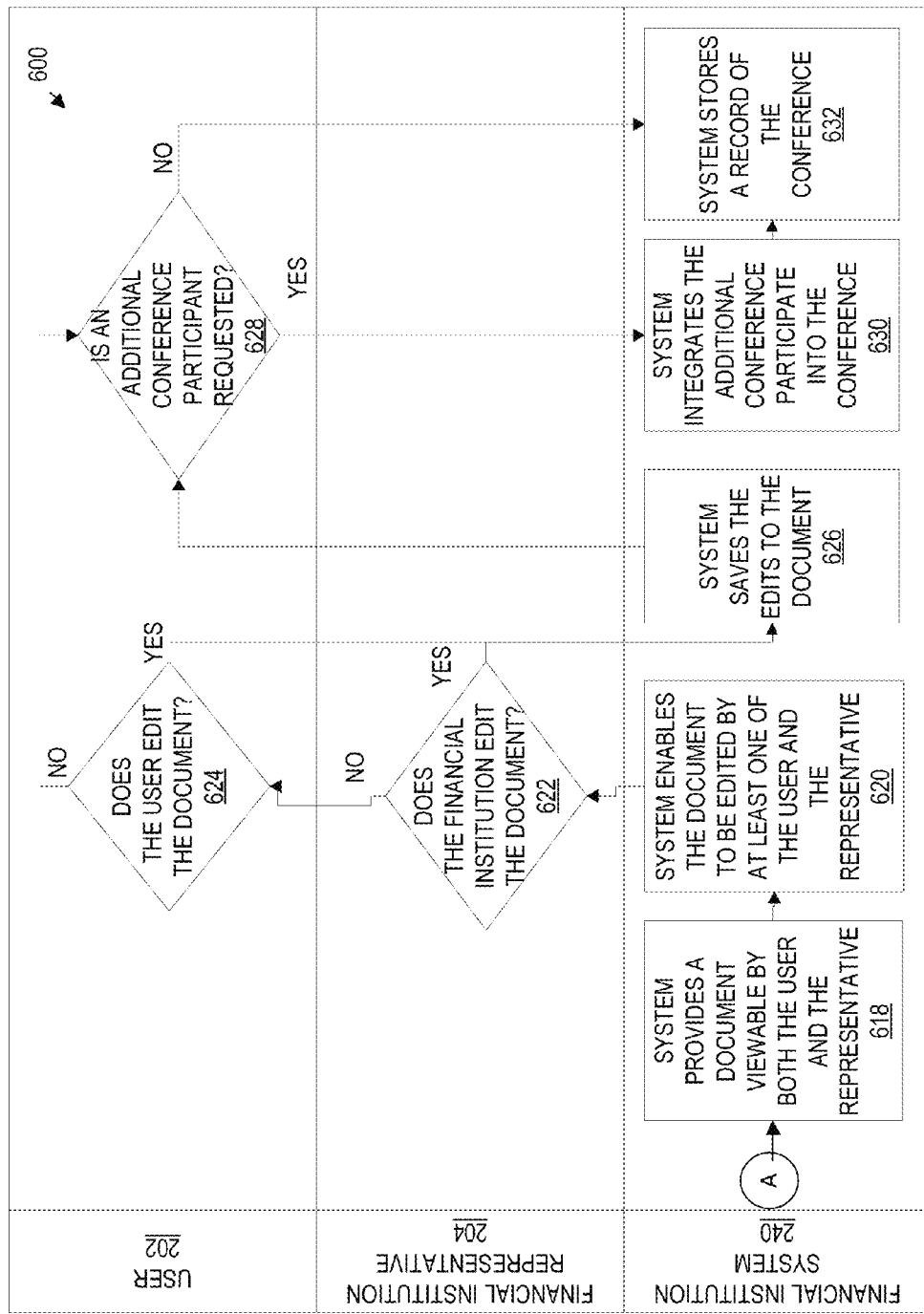

Having thus described embodiments of the invention in general terms, reference will now be made to the accompanying drawings, where:

FIG. 1 is a high level flowchart illustrating a general process flow for providing an interactive conference system, in accordance with embodiments of the present invention;

FIG. 2 is block diagram of an environment for providing an interactive conference system, in accordance with embodiments of the present invention;

FIG. 3 is a flowchart illustrating a general process flow for providing an interactive conference system, in accordance with embodiments of the present invention;

FIG. 4 is a flowchart illustrating a general process flow for providing a record of an interactive conference, in accordance with embodiments of the present invention;

FIG. 5 is a block diagram illustrating an interactive conference system and environment in accordance with various embodiments of the invention;

FIGS. 6A and 6B are a multiparty mixed block and flow diagram of an interactive conference system and method of providing a record thereof, in accordance with various embodiments of the invention; and FIGS. 7-13 are exemplary user interfaces and screenshots for implementing an interactive conference system, in accordance with embodiments of the present invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Additionally, while embodiments are disclosed as "comprising" elements, it should be understood that the embodiments may also "consist of" elements or "consist essentially of" elements.

Embodiments of the invention enable customers to interact with financial institution representatives over video conferencing and/or audio conferencing using a conferencing application running on, for example, a financial institution server and/or the customer's notebook computer. The variety of features may provide a customer an unprecedented balance of convenience, personalization, and exceptional customer service. Before or at the beginning of a call, a customer is given a set of representatives. The customer may select a representative based on information provided about the representatives such as their numbers of years of experience. While the customer is waiting for the call to commence, the customer may be provided information indicating the wait time until the call commences and may be given relevant information or links to information using the conference application, such as by a split screen showing relevant information as well as hold time information. In some cases, the customer is given an opportunity to play games or navigate the Internet for topics unrelated to the topic of the call. Once on a call, customers are given an opportunity to view and edit documents related to the call. In some instances, customers may collaborate on document creation and modification with the representative and the representative (or customer) may be able to point out sections of relevant documents to the customer such as by highlighting or inserting notes. The conferencing application may also generate an electronic call summary that may be specialized for the representative or the customer. This call summary may record the spoken words and convert them to text and correlate the text with the other interactions between the customer and the representative, for example, noting within the call log that the representative presented the customer with a specific document at a particular point in the conversation. The conferencing application may enable a customer to schedule a future conference with a representative with whom the customer has previously interacted (referred to as a "primary representative") or with a representative recommended by the primary representative. In some situations it may be advantageous for the conference to switch devices and/or include additional participants, so the conference application provides the customer flexibility in forwarding the call to other devices or back to the original device and/or inviting other participants onto the call.

Referring now to FIG. 1, a flowchart illustrates a process flow 100 representing the fundamental stages of a customer's interaction with the financial institution. These stages were discerned through a significant customer research project. The first stage of customer interaction, at Block 110, is the customer is triggered to contact the financial institution. Typically, the customer has a question about a financial product such as a product the customer is considering or a product the customer already owns. Whatever triggers the customer to initiate contact with the financial institution provides context for the conference regarding subject matter and may also provide the environment and circumstances surrounding the customer. Accordingly, various embodiments of the conferencing application were designed to address the needs and concerns of those customers who initiate conferences with the financial institution based on triggers. In order to maximize the customer experience and satisfaction with the conference application, and based in part on the triggers to the customer, the conference application, in some embodiments, ensures that the customer can make a personal connection with one or more financial institution representatives who may be able to provide expert advice to the customer regarding complex products or issues over a private and secure platform that overcomes common challenges to existing video technologies.

The next stage of customer interaction, at Block 120, is the customer initiating a conference with the financial institution using the conference application. The customer, having been triggered by an interest in a product or a question about a product or otherwise, may want to speak with a customer service representative. The customer, however, may not want to take the time to physically visit a brick and mortar financial institution location. The conference application provides an alternative to visiting a physical location along with numerous advantages to doing so such as the ability to electronically create and edit documents in collaboration with a representative.

In order to initiate a conference, a customer may use a customer device such as a computing device like a computer (desktop, laptop, tablet or the like), a smartphone or other computing device as represented by computing device 210 of FIG. 2. The computing device may have a conference application installed in its memory. The conference application may also be installed and running on one or more financial institution servers such that customers running the conference application on a customer device can communicate with the conference application running at the financial institution. The conference application for the customer device may be the same or different than the conference application running on the financial institution servers.

The conference application provides the customer an opportunity to select a representative with whom to speak in some embodiments. Several representatives may be presented to the customer in a list of representatives. In some embodiments, each of the representatives are presented by display of a still, moving, and/or live picture of the representative as well as some information about the representative. In some cases, the representative's professional qualifications and experience are presented to the customer for consideration, and in some cases, additional information about the representative is presented. For example, personal interest information may be presented, for example, the representative's hobbies, location, and favorite sports teams or favorite television shows may be presented to the customer for consideration. Once the customer has selected a representative to speak with, the application places the customer "on hold" for an immediate conversation with the representative or may present the customer with a date and time in the future for scheduling a call with the representative. The application may then remind the customer of the scheduled call in a variety of ways, such as using electronic calendar entries, alarms and the like. Either prior to an immediate call or a scheduled call, the customer may input some pre-call information to provide context for the call with the representative.

In some cases, such as for a premier customer, the application may provide all of the financial institution representatives assigned to the customer or with whom the customer has previously spoken. For example, the loan officer, the financial planner, the personal banker and the like associated with the customer may be provided to the customer for selection during the pre-conference representative selection. The application may also rank the representatives (either or both of assigned representatives and representatives previously spoken with) based on customer input, experience in relevant field or otherwise.

While the customer is on hold waiting for a conference call, the customer may be presented with one or more time consuming options while holding. The customer may be presented with information regarding the customer's wait until the connection with a live representative is made, such as a visual depiction of the queue of customers waiting for customer service related to, for example, a specific category of assistance or a specific representative. The visual depiction may also include information related to the time to connection and may include a "snooze" virtual button or other virtual input mechanism that receives customer input indicating the customer's desire to postpone the live connection with the representative. During the hold, the customer may be presented with informational videos relevant to the upcoming call. In some instances, the videos may be recordings of the representative for whom the customer is waiting or another representative familiar to the customer. Similarly, the customer may be presented with a widget or a portion of the application screen, such as a portion of a split screen for performing onsite research or offsite research, providing games to play while waiting, providing a data consumption bar during the hold as well as during the call, providing choices for connection speed (and possibly quality of video/audio, providing a listing of documents necessary and/or useful for the call and the like. In some instances, a widget or split screen portion provides access to the financial institution's online banking platform so that the customer may access information regarding his or her accounts maintained by the financial institution.

Referring again to FIG. 1, the next stage of customer interaction, at Block 130, is the customer participating in a conference with one or more financial institution representatives using the conference application. During the conference, the customer may be provided with various functions for improving the conference experience, for example, document sharing, visual navigation, video chat and call controls and multiple participants.

The application may present to the customer persistent call controls, such as for accessing an on demand customer service connection or other representative connection. An interface of the application may provide the customer an opportunity to highlight or select portions of text or graphics presented on the interface, such as highlighting portions of documents that are being discussed between the customer and the representative. The control of these shared documents may be retained by the representative or may be with the customer or both. The representative may direct the discussion away from a standard document to something more interactive such that the customer may have the ability to access portions of the document and enter/change information in the document. In some instances, the application may allow the customer and the representative to switch control of the document back and forth as necessary during the conference.

During a conference, a customer and/or a representative may need to bring one or more other people into the conference. This may be done by the customer, for example, by the customer vouching for the additional participant and, in some embodiments, verifying the additional participant electronically. In some cases, credentialing of the additional participant is by a verification process. When an additional representative is required on the conference, an interaction log may be provided to the new associate to bring him or her up to speed quickly. The customer may have a trusted group of representatives who may be quickly brought into a conference. If the customer has not interacted with a particular representative before, the customer may provide a confirmation of acceptance of a representative, based on pre-existing filters, review of provided representative information or the like.

In some embodiments, during a conference using the application, a customer is given an opportunity to promote and/or demote levels of connectivity. For example, the customer may choose to change from textual to audible to visual to audio-visual interaction with the financial institution representative and/or the opposite. Such channel hopping may be logged, such as in an interaction log. Also, the customer may auto-forward a connection initiated from a representative from one device to another device, such as from the customer's tablet computer to a smartphone. In some cases, the customer may forward the connection back to the original device or use a cross- and/or dual-channel presentation. For example, audio of the conference may be presented using one device and video may be presented using another device.

At Block 140, the customer and/or the representative concludes the conference and the conference application may perform one or more post-conference actions. For example, an e-receipt (also called an interaction log or record) may be finalized. The interaction log may be created automatically by the application during the conference and may include a recording and/or a textual representation of the words spoken during the conference. The interaction log may be used by the customer and/or the representative as a record of the call and the information/document shared during the call. From the perspective of the customer, the log may be used as a reference when completing tasks after the call has ended such as gathering or completing additional documents or following up as necessary. In addition to voice recordings and written text, the log may include, for example, copies of documents discussed, links to other information, highlighting and or notes taken during the call, and possibly timestamps indicating when in the call various actions occurred or documents were reviewed/highlighted and the like. The log may incorporate manual input as well. For example, the log may accept confirmation of portions of a conversation from one or both participants. In some instances, one or both participants may be able to remove unnecessary or repetitive portions of the log as desired. The log may include inset indications of highlighting of interface items and/or documents discussed during the conference. The participants of the conference may have different versions of the log, such as versions allowing the customer to comment/edit within the log manually and versions allowing the representative to comment/edit within the log manually.

In some embodiments, after the call has been completed archives of the interaction log and any documents discussed, created, edited or otherwise modified are stored by the financial institution and/or by the customer device (for offline access). These documents may be retrieved by the customer, such as by using the application or by logging into the customer's online banking website portal. In some embodiments, the application prompts the customer whether to store one or more of the log and/or the other document(s) discussed and prompts the customer regarding the storage location. In some embodiments, the customer is also given the option of communicating the log and/or other documents to one or more electronic destinations such as to one or more email addresses or the like.

Referring now to FIG. 2, a block diagram illustrates an environment 200 wherein a customer 202 participates in a conference with a financial institution representative 204 using a customer device 210 and a financial institution representative system 260, respectively. The environment also may include a financial institution system 240, other customer systems 280, other financial institution systems 282 and/or external websites 284. The systems and devices communicate with one another over a network 230 and perform one or more of the various steps and/or methods according to embodiments of the invention discussed herein.

A customer device 210 may be configured for use by a customer or other user, for example, to access one or more other financial institution applications such as the customer conference application 220. The customer device 210 may be or include a computer system, server, multiple computer system, multiple servers, or some other computing device configured for use by a user, such as a desktop, laptop, tablet, or a mobile communications device, such as a smartphone. The mobile device 210 has a communication device 212 communicatively coupled with a processing device 214, which is also communicatively coupled with a memory device 216 and one or more input and/or output devices 224, for example, an image capture device such as camera and/or a microphone. The processing device 214 is configured to control the communication device 212 such that the customer device 210 communicates across the network 230 with one or more other systems, for example, the financial institution representative system 260. The processing device 214 is also configured to access the memory device 216 in order to read the computer readable instructions 218, which in some embodiments include a customer conference application 220. The memory device 216 also may have a datastore 222 or database for storing pieces of data for access by the processing device 214.

The financial institution representative system 260 may be a workstation used by a representative to communicate with customers using the conference application. In some embodiments, the financial institution representative system 260 may communicate with one or more of the other systems or devices and may perform one or more steps and/or one or more methods as described herein. In some embodiments, the financial institution representative system 260 includes a communication device 262 communicatively coupled with a processing device 264, which is also communicatively coupled with a memory device 266 one or more input and/or output devices 224, for example, an image capture device such as camera and/or a microphone. The processing device 264 controls the communication device 262 such that the financial institution representative system 260 communicates across the network 230 with one or more other systems or devices. The processing device 264 is also configured to access the memory device 266 in order to read the computer readable instructions 268, which in some embodiments include a representative conference application 270 having instructions for communicating with the customer conference application 220 running on the customer device 210 and/or the server conference application 250 running on the financial institution system 240. In some embodiments, the financial institution representative system 260 includes one or more datastores 272 for storing and providing one or more pieces of data used by the representative during conferences with customers.

A financial institution system 240 is a computer system, server, multiple computer systems and/or servers or the like. The financial institution system 240, in the embodiments shown has a communication device 242 communicably coupled with a processing device 244, which is also communicably coupled with a memory device 246. The processing device 244 is configured to control the communication device 242 such that the financial institution system 240 communicates across the network 230 with one or more other systems. The processing device 244 is also configured to access the memory device 246 in order to read the computer readable instructions 248, which in some embodiments includes a server conference application 250. The memory device 246 also has a datastore 254 or database for storing pieces of data for access by the processing device 244. In some embodiments, the representative conference application interacts with the server conference application to access information, document or other data for use during a conference call. In some embodiments, a financial product information application 252 retrieves information regarding financial products being discussed during a call between a customer and a representative and provides the information to the customer and/or the representative during the call and/or after the call has ended.

The applications 220, 250 and 270 are for instructing the processing devices 214, 244 and 264 to perform various steps of the methods discussed herein, and/or other steps and/or similar steps. In various embodiments, one or more of the applications 220, 250 and 270 are included in the computer readable instructions stored in a memory device of one or more systems other than the systems 240 and 260 or device 210. For example, in some embodiments, the application 220 is stored and configured for being accessed by a processing device of one or more other customer systems 280 connected with a representative through network 230. In various embodiments, the applications 220, 250 and 270 stored and executed by different systems/devices are different. In some embodiments, the applications 220, 250 and 270 stored and executed by different systems may be similar and may be configured to communicate with one another, and in some embodiments, the applications 220, 250 and 270 may be considered to be working together as a singular application despite being stored and executed on different systems. In some embodiments, the applications 220, 250 and 270 stored and executed by the customer device and/or an application stored and executed on one of the other systems is a stand-alone application 220 and does not necessarily communicate or rely on any other applications for data, processing or otherwise, except for providing a connection with a representative through the application 270.

In various embodiments, one of the systems discussed above, such as the financial institution system 240, is more than one system and the various components of the system are not collocated, and in various embodiments, there are multiple components performing the functions indicated herein as a single device. For example, in one embodiment, multiple processing devices perform the functions of the processing device 244 of the financial institution system 240 described herein. In various embodiments, the financial institution system 240 includes one or more of the financial institution representative system 260, the other financial institution systems 282, and/or any other system or component used in conjunction with or to perform any of the method steps discussed herein.

In various embodiments, the financial institution system 240, the customer device 210, the financial institution representative system 260 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

Referring now to FIG. 3, a flowchart illustrating a general process flow 300 for providing an interactive conference system is provided, in accordance with embodiments of the present invention. In some embodiments, the system includes a memory; a processor; and a computing module stored in the memory, executable by the processor, and configured to cause the processor to: determine that an operative connection is being established between a user device of a user and a system associated with a representative of a financial institution, such that the user and the representative may conduct a conference; provide a document viewable by both the user and the representative during the conference; and enable the document to be edited by at least one of the user and the representative during the conference.

As discussed, an interactive conference system allows a customer or other individual to receive improved service from a financial institution. The benefits of the interactive conference system include, but are not limited to, more efficient review of documents, guided completion of documents and forms, personal assistance regarding customer queries, and secure and convenient storage of records associated with the conference. While the embodiments of the invention are primarily disclosed with respect to customers seeking assistance with financial queries, the system described herein may be adapted or used for other service industries such as government service providers, telecom services, or utility services.

In Block 310, the system determines that an operative connection is being established between a user device of a user and a system associated with a representative of a financial institution, such that the user and the representative may conduct a conference. In a general embodiment, a user seeks to establish a conference with a representative of a financial institution so that the user may receive personalized attention and assistance regarding a query the user may have. For example, the user may desire a mortgage and request assistance regarding mortgage rates, mortgage qualifications, and the application process. Assistance of a financial institution representative during an interactive conference would assist the user in navigating the mortgage application process. Of course, mortgage applications are merely an example and the user may receive assistance for a variety of queries or reasons during a conference. For example, issuance of other types of loans, refinancing of loans, establishing an initial or new account of any type, questions regarding account status and benefits, and so forth may be addressed in a conference between the user and the representative.

As used herein, an operative connection means a connection that operates to connect at least two devices. The operative connection may be wired or wireless. Data and information may be transferred over the operative connection such that the at least two devices are in communication. For example, the user may request a conference over the Internet. The user may begin establishing a connection between the user's device and a device at the financial institution. In some embodiments, the user logs into the user's account at the financial institution, such as on a webpage or application, in order to establish an operative connection between the user's device and the financial institution. In some embodiments, the user establishes the operative connection based on a network connection. For example, the user may have access to a secure connection and therefore be able to establish the operative connection. In an embodiment, the user's device is required to have security software so that the operative connection has an enhanced level of security. For example, the operative connection may be encrypted so that the conference can only be accessed by devices and/or individuals having permission to access the conference.

In some embodiments, the system determines that the operative connection is being established but that the operative connection has not been completed. In this embodiment, the operative connection has not yet been established but the user, the representative of the financial institution, and/or a third party has initiated the operative connection. The user may have requested a conference over the phone, via email, via text message, or via a website. In some embodiments, the user initiates the operative connection but in other embodiments the representative of the financial institution initiates the operative connection. For example, the user may be speaking with the representative on the phone. The representative determines that a video conference would be a more productive means of communication and offers to initiate a video conference with the user via the user's computer, laptop, tablet, or mobile device (e.g., smartphone or the like). In some embodiments, third parties such as merchants may facilitate the conference. For example, a user may be visiting a car dealership and have questions regarding a car loan. The car dealership may facilitate or initiate the conference with the financial institution on behalf of the user. In this embodiment, while the third party may initiate the conference, the third party does not have access to the conference until the user permits the third party access, as will be discussed in greater detail at a later point.

In further embodiments, the system determines when the operative connection is established. Establishment of the operative connection does not mean that the conference has started. For example, the operative connection may be established but the user may be in a queue waiting for the next or for a requested representative. In some embodiments, the user is provided options during the period between when the operative connection is established and when the conference begins. For example, the user may be able to upload documents, post questions regarding the purpose for the conference, view documents provided by the financial institution (e.g., FAQs), conduct searches for relevant information, play games, access personal documents on the user device, or other activities. In an exemplary embodiment, the time before the conference begins is provided to the user in a visual format.

The user device may be a desktop computer, a laptop computer, a tablet, a mobile device, or another type of computing device. For example, the user device may be a gaming system, a kiosk at a merchant or a public locale, or a rental device. In an exemplary embodiment, the user device is a computing device such as a tablet that allows the user to conduct a video conference, e.g., the user device includes a video camera, a microphone, speakers, and a display screen. In an embodiment, the user device is the previously discussed customer device.

As used herein, a user may be a customer of the financial institution but is not required to be. For example, the user may be an existing customer of the financial institution, meaning that the user has had at least one account with the financial institution either currently or previously active. The user may also be a new customer or a prospective customer of the financial institution. For example, the user may be an individual searching for competitive mortgage rates and discussing mortgage applications with multiple financial institutions. The user may not have a current or previous relationship with the financial institution but is considering developing one and would like to ask questions of a representative regarding the possibility of becoming a customer. The user may also qualify for enhanced level service representatives based on user criteria, e.g., length or breadth of relationship with the financial institution.

The system establishes the operative connection between the user device and a system associated with the representative of the financial institution. The system associated with the representative is to be broadly construed as being a set of hardware and software that provides the representative access to the conference. The system may include at least a portion of the financial institution system, e.g., the server and databases associated with the financial institution. For example, the system associated with the representative may provide access to a user's financial transaction history for a plurality of accounts. In some embodiments, the user first provides an access code or authentication code allowing the user and the representative to access portions of the user's data on the financial institution server. The system associated with the representative may also include the specific hardware and software that allows the representative to participate in the conference. This hardware and software may include the video camera, speaker, microphone, headset, display, and/or operating system for connecting with a variety of user computing devices.

In an embodiment, the representative is an employee of the financial institution. The representative may be a general customer service representative or a specialized representative. In an embodiment, the user is able to select the representative that the user would like to work with in the conference. In another embodiment, the representative is a contractor that works with the financial institution to provide customer service. For example, the contractor may provide specialized customer service in an area that financial institution employees do not specialize.

For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a debit account, a credit account, a non-monetary user profile that includes only personal information associated with the user, or the like. The account is associated with and/or maintained by the entity. In other embodiments, an entity may not be a financial institution.

The operative connection established between the user device and the system associated with the representative of the financial institution facilitates a conference between the user and the representative. In an exemplary embodiment, the conference is a video conference between the user and the representative. As will be discussed in greater detail, the conference allows interaction between the user and the representative. For example, the user and the representative may collaborate when working on a document, e.g., a mortgage application or the like. In some embodiments, the conference is a teleconference based on a phone system as well as an interactive display screen. In a still further embodiment, the conference is an interactive screen and text-based communication. For example, the user may be in a public locale and not desire audible communication with the representative. Instead, the user may communicate with the representative via text, such as by typing comments on a keyboard, while still have access to the interactive display screen. The user may be able to switch between types of conferences. In some embodiments, the user is able to conduct a conference while conducting other activities. For example, the user may be able to conduct a conference while a passenger in a vehicle. The in-vehicle communication system may establish an operative connection with the financial institution representative device and allow the user to complete the conference while traveling, such as in a car, a bus, an airplane, a train, a boat, or the like.

In Block 320, the system provides a document viewable by both the user and the representative during the conference. In general, the conference facilitates working with documents by allowing one or both of the user and the representative to view, edit, and/or save a document. Often, a user or representative will benefit from viewing a document during a conference so that questions can be answered about the document, the document can be fully or partially completed, or the document can be referenced for confirmatory purposes. In an embodiment, at least one party to the conference can see what the other party to the conference is doing. For example, the representative may be able to see what the user is typing into a form, or the user may be able to see where the representative is hovering a cursor.

As used herein, a document is a broad term that encompasses both discrete documents and changeable documents. An example of a discrete document is an application for a mortgage. An example of a changeable document is a transaction register for an account with the financial institution. In an embodiment, a document is an application, a form, or source of information associated with or of interest to the user, to the financial institution, or to a third party. The document may be provided by the user. For example, the user may upload, scan, email, or produce a document and provide it to the system. During a single conference or even prior to the conference, the user may do all of the above. For example, the user may scan in the user's employer tax documents, upload an electronic version of the user's tax documents filed with the government, and email scanned copies of receipts showing the current year's charitable donations or business expenses. In another embodiment, the user may be working on a document on the financial system's server and determine that a conference would be useful. The user would then initiate the conference and be able to retrieve or import the partially completed document into the conference so that the user may get assistance from the representative. All of these documents may be provided to the user and the representative during the conference so that both participants have access to the documents during the conference.

In a further embodiment, the representative provides access to the documents or documents. For example, the representative may be discussing the user's question during the conference and determine that the user should consult a specific form provided by the financial institution. In an embodiment, the representative has access to a forms bank which may be provided to the user by selecting the appropriate document. In a still further embodiment, the forms bank is organized by category and/or searchable (e.g., by keyword). In a further embodiment, the representative is able to access documents from systems external to the financial institution. For example, the representative may be able to pull documents from government websites, e.g., tax forms, or documents from third parties, e.g., loan rates for competitors.

In an embodiment, the document is manipulated when the document is made available to the system. For example, the document may be converted to editable text, or made searchable. For example, an optical character recognition (OCR) software may be run on an uploaded document so that the text in the document is identified and made available for editing and searching. In another embodiment, data in the document are identified and captured. For example, data in the user's tax form may be extracted and automatically populated in other documents that are being discussed or manipulated during the conference. For example, the user's uploaded tax form may be identified, analyzed, the user's adjusted gross income (AGI) extracted, and the AGI input automatically input into a mortgage application that the user and the representative are viewing during the conference.

As discussed, at least one document is viewable by both the user and the representative during the conference. In some embodiments, the user has control over which document is viewable. For example, the user may tag some documents as private, e.g., the user's tax documents, and some as available for viewing during the conference, e.g., the user's mortgage application. Data from a private document may still be populated into a public document, subject to the user's settings. In an embodiment, the user and the representative view the document concurrently. For example, the document may be provided in a portion of the display screen, e.g., a window to the side of the screen, to top of the screen, or to the bottom of the screen. In an embodiment, each of the user and the representative are able to determine the display position of the document in their respective screens. For example, the user may make the document large and centered in the user's display screen. The representative, however, may make the document smaller and positioned in the rightmost side of the representative's display screen. In some embodiments, the document is a single document that both the user and the representative may view at the same time. In another embodiment, the document is a single document viewable by the both the user and the representative but both the user and the representative are able to edit the document separately. In some embodiments, the user and the representative are able to view both the copy of the document that they are viewing and the copy of the document that the other party is editing.

The user and the representative are able to view the document during the conference. In an embodiment, the document may be pulled up by either the user or the representative. The document may be hidden, saved, reset to default settings, or closed during the conference as well. In an embodiment, one or both of the user and the representative may view the document before the conference. For example, the user may view the document when waiting to connect with a representative after the operative connection has been established. The representative may view the document if the user provided the document or if the representative is aware of the content of a prospective conference (e.g., a scheduled conference) with a user and the representative knows or suspects that the document will be helpful during the conference. In some embodiments, the system provides a customer view of the representative's screen. For example, the customer view may provide a filtered view of the representative's screen so that certain information on the representative's screen is not provided to the user. In an embodiment, private or representative information (e.g., representative ID number, representative full name) is filtered from the customer view. In another embodiment, user information provided to the representative is filtered in the customer view. For example, the user may not see the full information relating to the user's relationship to the financial institution that is available to the representative during the conference.

In Block 330, the system enables the document to be edited by at least one of the user and the representative during the conference. In an embodiment, the document is edited or editable real-time by both the user and the representative. For example, the user may be completing a first portion of the form and the representative may be completing a second portion of the form. In an embodiment, the system enables the document to be edited by converting a scanned version of a document, e.g., a non-editable version of the document, into an editable version of the document. As discussed, OCR software may recognize characters in the document and convert the document into an editable form.

In some embodiments, the system enables the document to be edited by providing tools for editing the document. For example, a toolbar for editing the document may be provided to the user and/or the representative. The toolbar may be able to be docked, e.g., able to be attached to a region of the screen, hideable, e.g., disappears until the user hovers a cursor over the area, or customizable. The user may select which icons display in the editing toolbar. In some embodiments, the toolbar is customized based on the subject matter of the conference. For example, a toolbar displayed when editing an account register may be different from a toolbar displayed when editing an application. The toolbar for editing the account register may include tools for highlighting, annotating, or otherwise commenting on transactions in the account register but not include tools for changing text in the account register. In contrast, the toolbar for editing the application may include tools for inputting information into the form, such as the user's name.

The user and/or the representative may edit the document in many different ways. As discussed, the document may be annotated with notes. All of or portions of the document may be highlighted or otherwise emphasized, e.g., the text color or size may be changed. Text may be italicized, underlined, or bolded. In an embodiment, the system includes an automatic language translator such that the language of the document may be converted from one language to another language. Similarly, the system may include a currency or general calculator. In this manner, an amount listed in one currency can be automatically converted into another currency based on current, user-defined, or representative-defined exchange rates. The document may be zoomed in, enlarged, or its orientation changed. In an exemplary embodiment, the document is modified to include links, e.g., hyperlinks, to additional information. For example, a scanned document including a URL for a webpage may have the URL activated so that the user and/or the representative may access the webpage by clicking on the link in the document. In another embodiment, the links direct the user and/or the representative to a Frequently Asked Question site or to a more detailed information view (e.g., clicking on a check amount in a transaction register may direct the user to another document that provides an image of the check).

In some embodiments, the system provides a working area during the conference. For example, the system may provide a portion of the screen where the user and/or the representative can write notes, copy and paste images from other documents or pages referenced during the conference, or perform calculations. In an embodiment, the working area is private to either the user or the representative. In some embodiments, the party using the working area can make the working area accessible to the other party. For example, the user may have a private working area where the user is making notes. The user may determine that it would be helpful to allow the representative to view the working area notes and therefore makes the user's working area accessible to the representative. In some embodiments, the user types to enter text into the working area. In another embodiment, however, the working area receives data from a tablet screen or the like and converts the data into text and/or images. For example, a user may write on a tablet screen using a device or finger and the data received from the tablet can be converted into text. Similarly, the user may speak into a microphone and the spoken words may be converted into text in the working area. In a still further embodiment, a media capture device, such as a still camera or video camera, can capture data and import it to the working area. For example, the user may capture an image of the user's tax form and import it into the working area. It should be understood that data and information in the working area may be moved to the documents and vice versa. For example, the user may import an image of the user's tax records into the working area using a camera, convert the image of the tax records into editable text in the working area, and import the tax record information into a mortgage application provided by the representative during the conference.

In a still further embodiment, the system provides links to external sources of data, such as webpages, government forms, merchant offers, and the like, during any portion of the conference. Links to external sources of data may be provided in the working area, in the documents, in the toolbars, or, as will be discussed, in a sidebar allowing control of the conference.

In an exemplary embodiment, the system provides direct access to the user's financial information for ease of reference during the conference. In some embodiments, the financial information is information associated with the user's accounts at the financial institution. In some embodiments, additional financial institutions are connected to and information from the additional institutions is available to the user and/or the representative during the conference. In a still further embodiment, additional financial-related information, such as credit reports, credit scores, and the like are available during the conference as well. The system facilitates communication between a user and a representative of the financial institution so that the user can receive enhanced service. Any information that may enhance the service the user receives and that is obtainable over a network may be accessed by the system to assist the user. For example, social networking data may be evaluated to provide additional information to the user regarding financially-related questions.

In some embodiments, the system provides interactive controls for manipulating the conference. The interactive controls for manipulating the conference are different from the editing toolbar for editing the documents. The interactive controls allow the user to control the conference itself rather than documents viewed in the conference. There may be overlap in functions available in the interactive controls and the editing toolbar, but the interactive controls and the editing toolbar may also be different modules available during the conference. The interactive controls allow the user to save, annotate, highlight, star, or otherwise control the conference.

In an embodiment, the interactive controls are positioned on the display screen, such as in a sidebar. The sidebar may be permanently displayed during the conference, hideable (e.g., the sidebar may disappear until the user moves the user's cursor over the area of the sidebar), and/or resizable and movable by the viewer, i.e., the user or the representative. For example, the user may move the sidebar from the left side of the display screen to the right side of the user's display screen. The sidebar may be customizable by the viewer. For example, the user may identify the icons that will be present in the sidebar as a default for every conference or for the current conference. In some embodiments, the sidebar changes based on the subject matter that will be or is being discussed during the conference.

In one embodiment, the user and/or the representative is able to begin or halt recording of the conference. In some embodiments, conferences are automatically recorded. In other embodiments, the conference is not recorded until the user selects the record option. The user may determine that a portion of the conference should or should not be recorded and can affect this determination by toggling recording on and off. In some embodiments, the recording is an audio recording of the conference. In another embodiment, the recording is a visual recording of the conference. In a still further embodiment, the recording is both an audio and a video recording of the conference.

In an embodiment, the user and/or the representative is able to highlight all or portions of the conference. For example, the user may highlight a portion of the conference recording so that the user knows to review that portion of the conference at a later time. Highlighting at least a portion of the conference may indicate the start and stop time of the highlighted portion, as well as the person causing the portion to be highlighted. For example, the representative may highlight important portions of a conference that the user should follow-up on. The representative highlights the portions by selecting a button the representative's sidebar and the user is notified when reviewing the conference record that the representative has highlighted certain portions. In an embodiment, the user and/or the representative is able to quickly and easily move to the highlighted portions by selecting them in a graphical user interface.

Similarly, in some embodiments, the user and/or the representative may tag all or a portion of a conference. For example, the user may tag a portion of the conference as directed to "follow-up required." The tags may be provided by the user and/or by the representative. In some embodiments, default tags are provided by the financial institution, such as "signature required," "privacy statement," or "explanation of benefits." By tagging portions of the conference, the user and/or the representative is better able to organize the record of the conference when the user, the representative, or a third party views the record of the conference.

In a still further embodiment, the user and/or the representative may annotate all or a portion of a conference. For example, the user may write notes that apply to a portion of the conference. In an example, the user may annotate a portion of a conference directed to mortgage qualifications with the note "Check with the insurance agent." The user may write notes based on the content of the conference or based on subject matter that was not discussed in the conference but which the user desires to follow-up on. Annotations may be written, audio, visual, hyperlinks, or multimedia. A file may be annotated to all or a portion of the conference. Documents, including saved versions of documents that were edited during the conference may be annotated and added to the conference.

In some embodiments, the user and/or the representative are also able to invite additional participants to participate in the conference. For example, the user may determine that the user's husband should also be on the conference. The system may provide an option to integrate the user's husband into the conference, such as by sending the user's husband a link to establish an operative connection. Similarly, the representative may determine that another representative, such as a specialized representative, may be beneficial to have on the conference. The representative may invite the specialized representative to participate in the conference instead of or in addition to the representative. In some embodiments, permission of one or both of the original participants is required before an additional participant may be added. For example, the user may be required to permit another individual, such as a loan manager for a car dealership, to view the user's conference before the other individual is provided access to the conference. In this manner, the user is able to protect the user's confidential information and provide access to only those individuals whom the user permits.

In some embodiments, other interactive controls are possible. For example, the user may end the conference, save the conference, reschedule the conference for another time, or rewind all or a portion of the conference. In some embodiments, the interactive controls relate to feedback for the representative, such as ranking, liking, or commenting on the representative. In a still further embodiment, the interactive controls may send a record of the conference up to the current point to the user.

In sum, the general process flow 300 of FIG. 3 provides a high-level overview of a system for providing an interactive conference. The system is not limited to the examples disclosed herein. One skilled in the art, given the teachings disclosed herein, would be able to determine other variations, such as other information that may be provided to the user during the conference, other ways of editing documents, or other ways of providing interactive controls for the conference.

Turning now to FIG. 4, a flowchart illustrating a general process flow for a system for providing a record of an interactive conference is provided, in accordance with embodiments of the present invention. In an embodiment, the system includes a memory; a processor; and a computing module stored in the memory, executable by the processor, and configured to cause the processor to: determine that an operative connection has been established between a user device of a user and a system associated with a representative of a financial institution, such that the user and representative are conducting a conference; identify a document referenced during the conference; capture at least a portion of the conference in a record; associate the document with the record; and store the record.

As discussed, an interactive conference system allows a customer or other individual to receive improved service from a financial institution. In many embodiments, the user desires to have a record of the interactive conference. The record reassures the user that topics discussed during the conference can be reviewed at a later date. In some embodiments, the record is easily searchable, provided to the user, stored by the financial institution, and/or contains links and copies of documents discussed during the conference. The record also allows the user to review the conference to determine whether any errors were made and, if necessary, correct those errors.

In Block 410, the system determines that an operative connection has been established between a user device of a user and a system associated with a representative of a financial institution, such that the user and the representative are conducting a conference. As discussed with respect to FIG. 3, the system establishes a connection over a network between a user device of the user and a system associated with a representative of the financial institution.

When preparing a record of the conference, the system determines that the user and the representative are conducting a conference. The system may determine that the user and the representative are conducting a conference immediately upon the operative connection being made. In another embodiment, the system determines that the user and the representative are conducting a conference when the video or audio conference between the user and the representative starts. In some embodiments, the system determines that the user and the representative are conducting a conference only when the user and/or the representative indicates, such as by selecting a record button, that the system should begin recording.

In Block 420, the system identifies a document referenced during the conference. In some embodiments, the system identifies the document based on the document being imported into the conference by either the user or the representative. In an embodiment, every document brought into the conference is automatically identified and catalogued. For example, each document provided by the user for discussion during the conference, even if the document is never referenced or opened during the conference, may be associated with the conference. The documents may be tagged with the time, date, and participants (e.g. name and contact information) of the conference.

In an embodiment, a document may not be imported by either of the user or the representative during the conference but still be associated with the conference. For example, the user or the representative may access the document at an external site via a link provided during the conference. In another embodiment, the user or the representative indicate that a document is associated with the conference, even if the document is not imported or linked to during the conference. For example, the user may indicate that an account register of a credit card account is relevant to the subject matter of the conference, such as by using a drop down menu, even though the credit card account was never referenced or linked to during the conference.

In Block 430, the system captures at least a portion of the conference in a record. The system may record the conference, such as a video recording and/or an audio recording. In an exemplary embodiment, the record is a complete record of all of the video and audio that occurs during the conference. For example, the record may be a video recording of the call. In some embodiments, the record is a portion of the conference, such as a portion selected or initiated by the user. The system may capture the record based on real-time recording or based on reconstruction of the content of the conference at a later point.

In an embodiment, the record is an electronic file that includes the audio and visual of the conference, any edits, tags, annotations, or the like made during or after the conference, and any documents associated with the conference. The record may be encrypted and/or password protected. As will be discussed, the record can be saved, archived, or shared with the user, the representative or a third party.

In some embodiments, the record is augmented. For example, the system may transcribe the audio from the conference so that the record includes a text transcription of the audio content of the conference. In an embodiment, the transcription also includes translation functionality such that a conference conducted in a first language may be transcribed into a second language.

In an embodiment, the record may be edited by the user and/or the representative. In an embodiment, two or more records may be created for the same conference. For example, a basic record may be recorded that includes only the audio and video of the conference. Each party to the conference may also create personalized records, such as records that include personal annotations, tags, and notes. In some embodiments, the user editing a record of a conference is able to populate other records of the conference with the same edits. For example, if a user edits a record of a conference after the conference to include notes, the user may be able to populate those notes to a record stored on a server affiliated with the financial institution. In other words, the system may allow for records to be maintained over various locations, e.g., the user's personal hard drive or server, the financial institution server, and the like.

In some embodiments, the system provides a summary of the conference. The summary of the conference may be provided by the user and/or the representative. In some embodiments, the summary of the conference is determined by the system based on keywords identified during the conference. For example, a list of the words most frequently discussed in the conference may be provided in a summary. Documents discussed during the conference may be listed in a summary. Accounts discussed during the conference may be listed in a summary.

In Block 440, the system associates the document with the record. Associating the document with the record may mean attaching a copy of the document to the record. In some embodiments, a copy of an edited document and an original version of the document are attached to the record. In some embodiments, a redline version of a document showing changes from the original document to the edited document is attached to the record. The document may be stored in a database associated with the record and accessible via a link. In an embodiment, the documents are categorized as they are associated. For example, user and financial institution documents may be stored in a different location. The documents may be analyzed for content and/or keywords and categorized based on the results of the analysis.

In Block 450, the system stores the record. The record may be saved on a hard drive associated with the representative's computing device, in a server associated with the financial institution, on the Internet, in a third party storage facility, and/or on the user's computing device. For example, in an embodiment both the financial institution and the user retains a copy of the record. In an embodiment, the system includes hardware and software functionality for maintaining a consistent record, e.g., populating edits in one record into all other copies of the record. In another embodiment, populating edits requires permission from the party possessing the record. For example, the user may be required to provide permission before the user's copy of the record can be populated with edits made by the representative.

In some embodiments, the system allows for searching of the record. For example, the record may be searched based on documents or accounts discussed, keywords mentioned, by user, or by representative. In an embodiment, the financial institution maintains records for all of the conferences between the user and representatives of the financial institution. The user is able to search the plurality of records to identify records that correspond to the user's specific query. As discussed, the transcription properties of the record enable the user to search records using textual keywords and identify subject matter in records based on spoken or audible words that have been transcribed.

In a further embodiment, the system allows filtering the records. In an embodiment, the record includes a large amount of information available related to the conference, e.g., documents, annotations, transcriptions, audio and video records, and the like. In this situation, a user and/or representative may be interested in only viewing certain types of information available in the record. For example, the user may be interested in only seeing the documents and transcription of the record. The system allows users and/or representatives to filter out (or conversely, select) certain types of information present in the record so that the user and/or representative is able to view the material that the user and/or representative is interested in. In an embodiment, the types of information associated with the record are provided in a selectable format, such as check boxes, which the user is able to check or uncheck in order to include or hide material when viewing the record.

In a still further embodiment, the system provides or shares the record. The system may provide or share the record with the user, with another financial institution, or with a third party authorized by the user. The record may be emailed or otherwise transferred to the user. In an embodiment, the record is automatically emailed to the user upon completion of the conference. In some embodiments, the record is made available to the user via an application on a mobile device.

In an exemplary embodiment, the record is provided to a representative when the user initiates a later conference. For example, if the user requests multiple conferences regarding a specific question, or must end a previous conference early, the user may share the record of the earlier conference with the representative in the later conference. In this manner, the representative in the later conference can quickly determine what was discussed previously. The user will not be required to provide the same information a second time.

Thus, the general process flow 400 of FIG. 4 provides a high-level overview of a system for providing a record of an interactive conference. The system is not limited to the examples disclosed herein. One skilled in the art, given the teachings disclosed herein, would be able to determine other variations, such as other ways of editing the record, or of providing the record to the user, from those disclosed herein.

FIG. 5 provides a block diagram illustrating an interactive conference system and environment in accordance with various embodiments of the invention. FIG. 5 is similar to FIG. 2 and is provided to illustrate that more than two parties may participate in a conference. For example, user 202 may be conducting a conference with representative 204 over the network 230. During the conference, the user 202 may determine that a second user 203 should be on the conference. The user 202 and/or the representative 204 send an invitation to the second user 203 to join the conference. The second user 203 is then able to join the conference over the network 230. Similarly, a second representative 205 may also join the conference, either at the request of the user 202 or the representative 204. Parties to the conference may have access to the financial institution banking system 240, including the user's financial account data, and in some embodiments also includes access to a secondary financial institution 502. The numbers and relative connections of the parties to the conference is merely illustrative and it should be understood that three, four, or more users and/or representatives may participate in a conference in order to provide appropriate service to the user.

Turning now to FIGS. 6A and 6B, a multiparty mixed block and flow diagram 600 of an interactive conference system and method of providing a record thereof is provided, in accordance with various embodiments of the invention. Within the flow diagram 600 different entities are being depicted as performing an action. For example, the system 240, the representative 204, and the user 202 are depicted as performing actions that, in some cases, lead to other actions in the flowchart. It should be understood that the entity performing the action is not required to perform the action. For example, a different entity may perform the action or the action may not be performed at all. Also, the flow diagram 600 depicts a specific order of events occurring but this is for exemplary purposes only. The events may occur in a different order from that disclosed without departing from the invention.

Turning now to Block 602, the system determines that an operative connection is being established such that a conference may be conducted. In an embodiment, a user seeks to establish a conference with a representative of a financial institution so that the user may receive personalized attention and assistance regarding a query the user may have. The operative connection connects the user device of the user and the system of the representative of the financial institution such that a conference can be conducted.

In Block 604, in some embodiments the system begins capturing the conference. As discussed, in some embodiments the system automatically begins capturing, e.g., recording, the conference when an operative connection is established. The system may begin capturing the conference upon the request of the user and/or the representative as well. Similarly, the user and/or the representative may request that the system stop capturing the conference at any point during the conference. In an embodiment, both parties must acquiesce when a party either begins capturing or halts capturing of the conference.

In Decision Block 606, in some embodiments the system determines whether the user is a customer of the financial institution. The user may be a customer of the financial institution or may have no pre-existing relationship with the financial institution. In an embodiment, the system determines whether the user is a customer of the financial institution based on log-in information when accessing the conference. For example, the user may log in with the user's financial institution access codes. In another embodiment, the system determines that the user is a customer of the financial institution based on the user's contact information or name. For example, the user may be connecting via a smartphone that is registered with the financial institution. In a further embodiment, the system may determine that the user is a customer of the financial institution by querying the user.

In Block 608, in some embodiments the system identifies an account of the user. When the user is a customer of the financial institution, the system may identify an account of the user. In this manner, the user and/or the representative have quick access to the user's account for reference during the conference. In an embodiment, all of the accounts of the user at the financial institution are identified. In a still further embodiment, accounts of the user at other financial institutions are also identified.

In Block 610, when the user is not a customer of the financial institution, the representative and/or the system prompts the user to create a relationship with the financial institution. In an embodiment, the relationship may mean that the user agrees to terms and conditions of use of the conference. For example, the terms and conditions may indicate the user's understanding that participating in the conference does not create a fiduciary duty between the user and the financial institution. The relationship may also be that the user opens up a new account with the financial institution, thus becoming a customer. In a still further embodiment, the relationship may be that the user is considering becoming a customer and would like to open up a preliminary account inquiry. For example, the user may be considering applying for a mortgage through the financial institution and would like to discuss the process with a representative but without actually opening an account.

In Decision Block 612, the user either accepts or declines the relationship with the financial institution. If the user declines the relationship with the financial institution, the process ends, as shown in block 614. For example, if the user declines to accept the terms and conditions of the conference the process will end and the user will not be transferred to a conference with a representative.

If, however, the user accepts the relationship, then turning to Block 616, in some embodiments the system receives a request from the user. The request may be a request for assistance, such as when the user has a question, would like to open an account, or requires guidance in completing an action associated with the financial institution. In an embodiment, the request is the reason the user initiated the conference. The user may provide the request in advance of the conference or type the request in during the conference. In some embodiments, the system assists the user in formulating the request. For example, the system may provide common requests or customized requests to the user, such as in drop down menus.

In Block 618, the system provides a document viewable by both the user and the representative. In an embodiment, the document may be pulled up by either the user or the representative. The document may be hidden, saved, reset to default settings, or closed during the conference as well. In an embodiment, one or both of the user and the representative may view the document before the conference. For example, the user may view the document when waiting to connect with a representative after the operative connection has been established.

In Block 620, the system enables the document to be edited by at least one of the user and the representative. In an embodiment, enabling the document to be edited means allowing the user and/or the representative to make changes to the document. In an embodiment, the document is converted from a non-editable document to an editable document via the system, such as using OCR software. In Decision Block 622, the representative may edit the document. For example, the representative may annotate the document with a note that the user should review a specific portion of the document. In Decision Block 624, the user may edit the document. For example, the user may input user information into the document.

If either the representative or the user edits the document, the system saves the edits to the documents, as shown in Block 626. Separate documents may be saved for the user and/or the representative. For example, the user may have a copy of a document saved with the user's edits and the representative may have a copy of the document saved with the representative's edits. The edits may be saved on the server or on personal user devices. In an embodiment, a redline copy of the changes to the document is also saved, or differences between the representative copy and the user copy.

In some embodiments, an additional conference participant is requested, as shown in Block 628. For example, the user may determine that a financial planner should also be on the conference. The system may provide an option to integrate the financial planner into the conference, such as by sending the financial planner a link to establish an operative connection. Similarly, the representative may determine that another representative, such as a specialized representative, may be beneficial to have on the conference. The representative may invite the specialized representative to participate in the conference instead of or in addition to the representative. In some embodiments, permission of one or both of the original participants is required before an additional participant may be added. For example, the user may be required to permit another individual, such as an investment advisor, to view the user's conference before the other individual is provided access to the conference. In this manner, the user is able to protect the user's confidential information and provide access to only those individuals whom the user permits. In a still further embodiment, it is determined during the conference that the user qualifies for a different level of representative. For example, the user may have sufficient funds in a checking account to qualify for a premier or concierge level representative. In this situation, the primary representative can request or suggest that the different representative be added to the call.

If the additional conference participant is requested, the system integrates the additional conference participant into the conference as shown in Block 630. In an embodiment, the additional conference participant has all of the same permissions as the original user. In another embodiment, the additional conference participant has limited access and control over the conference. For example, the additional user may not be able to control the sharing of the conference, the editing of the documents, or the recording of the conference.

In some embodiments, the system also stores the record of the conference as shown in Block 632. As discussed herein, the record of the conference may be stored and optionally shared after the conclusion of the conference. The system may allow the record to be manipulated, e.g., edited, tagged, annotated, and the like.

This exemplary mixed party block and flow diagram 600 presents an exemplary embodiment of the systems for providing an interactive conference and a record thereof. Additional steps may occur, as well as additional parties may interact with the disclosed parties to provide and/or control the systems disclosed herein.

Figure 7:
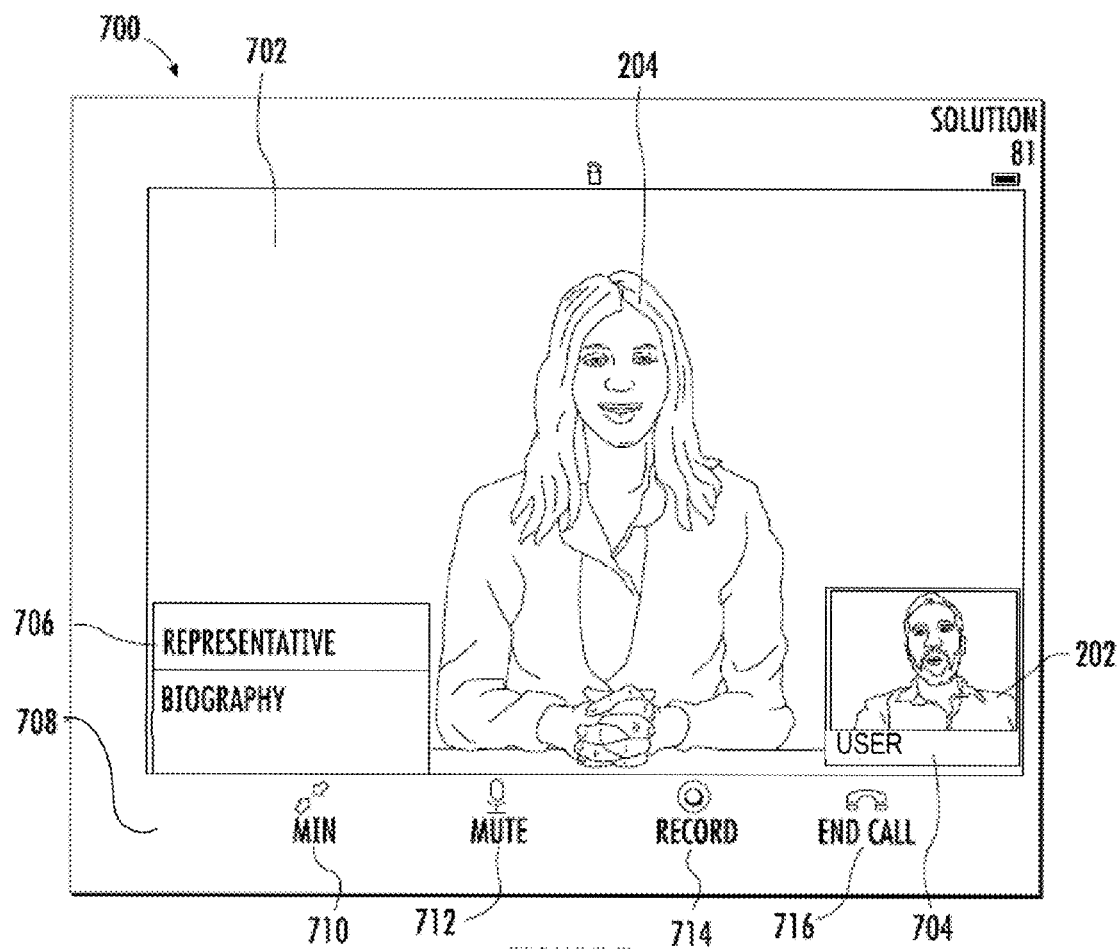
Figure 8:
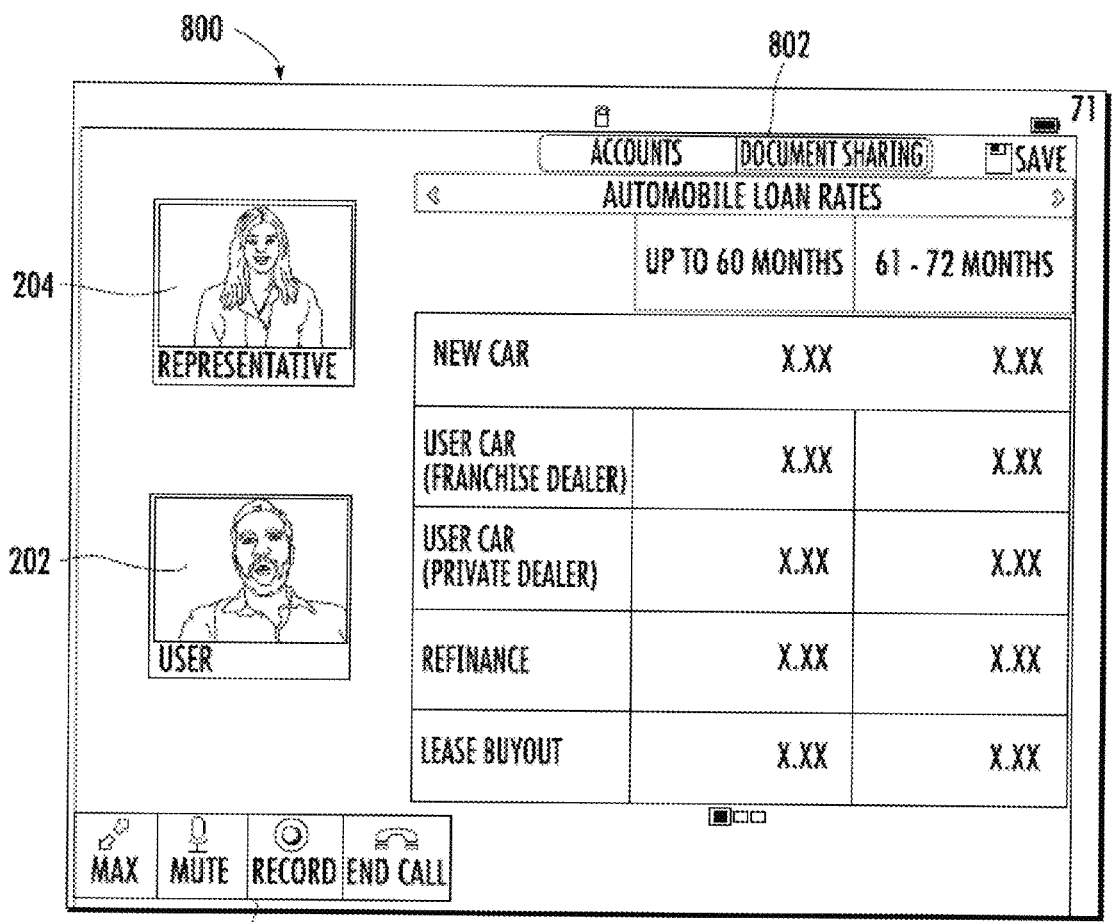
Figure 9:
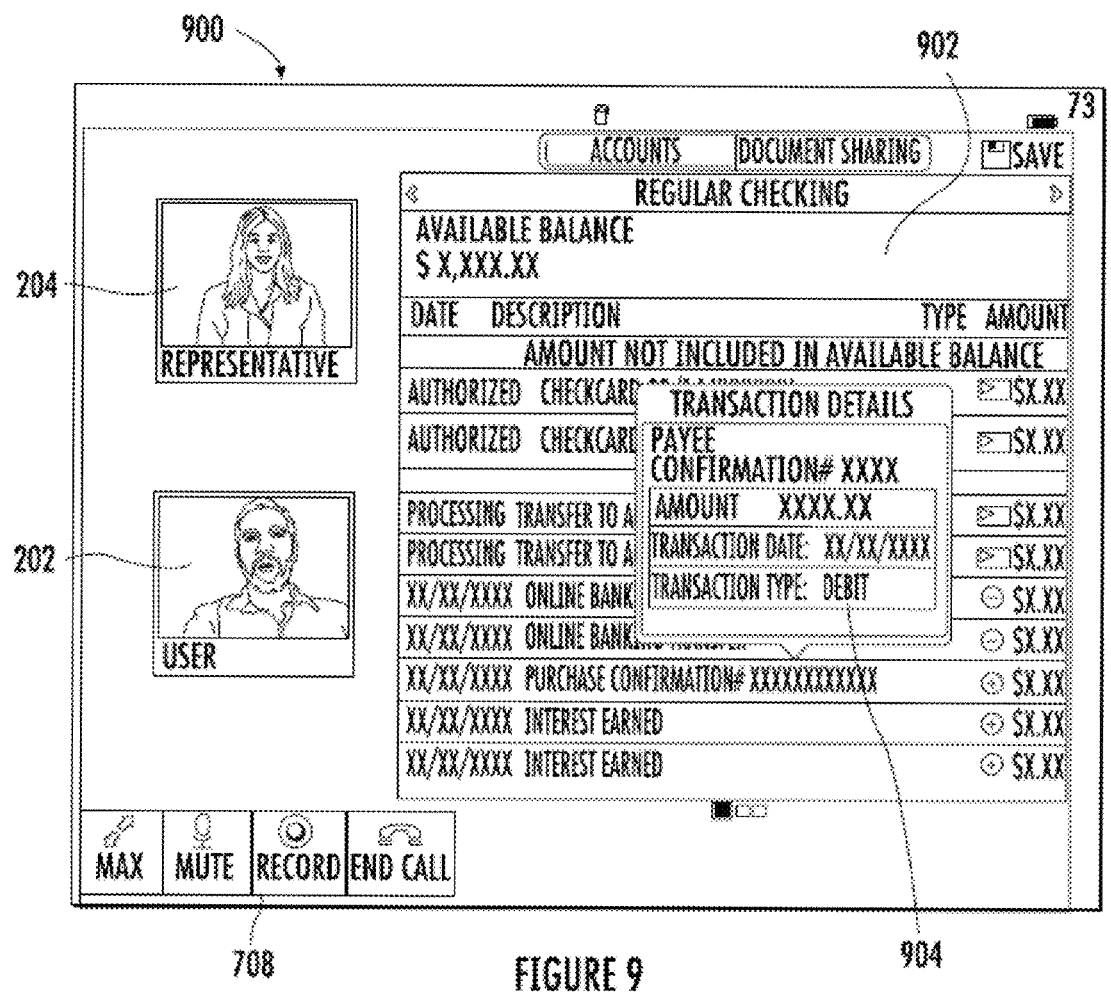
Figure 10:
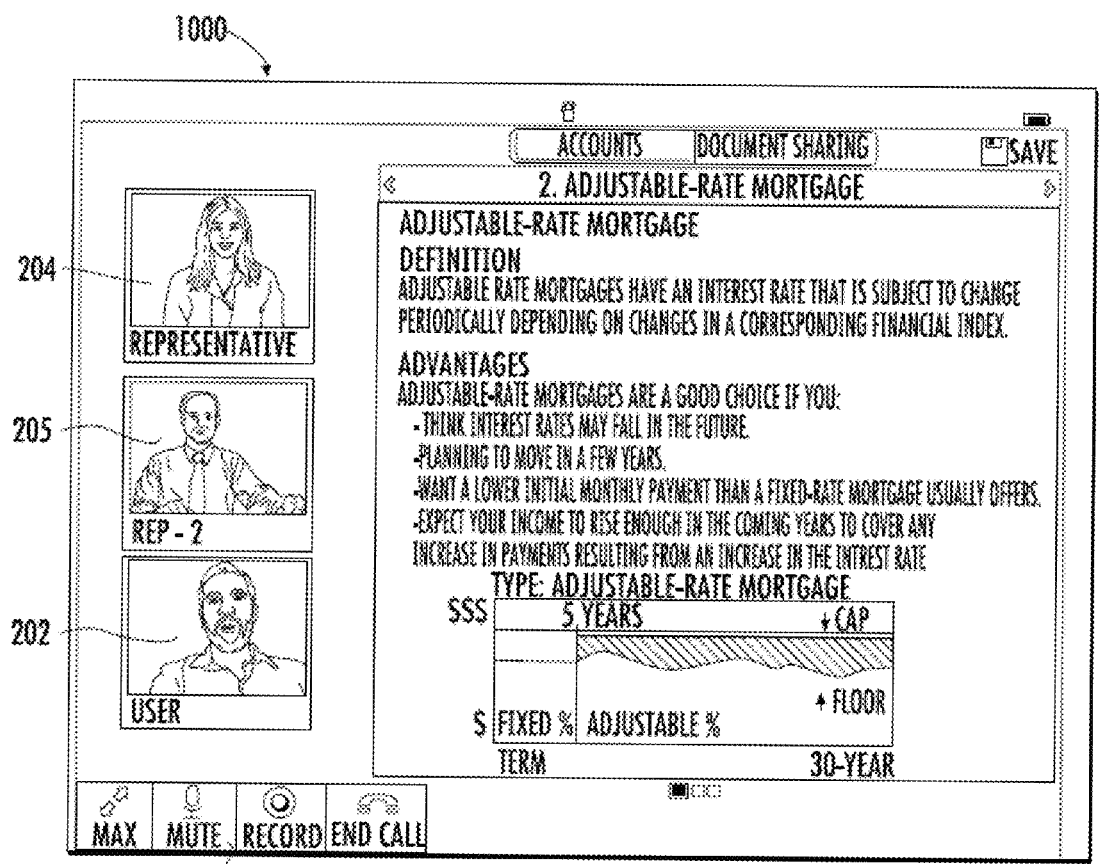
Figure 11:
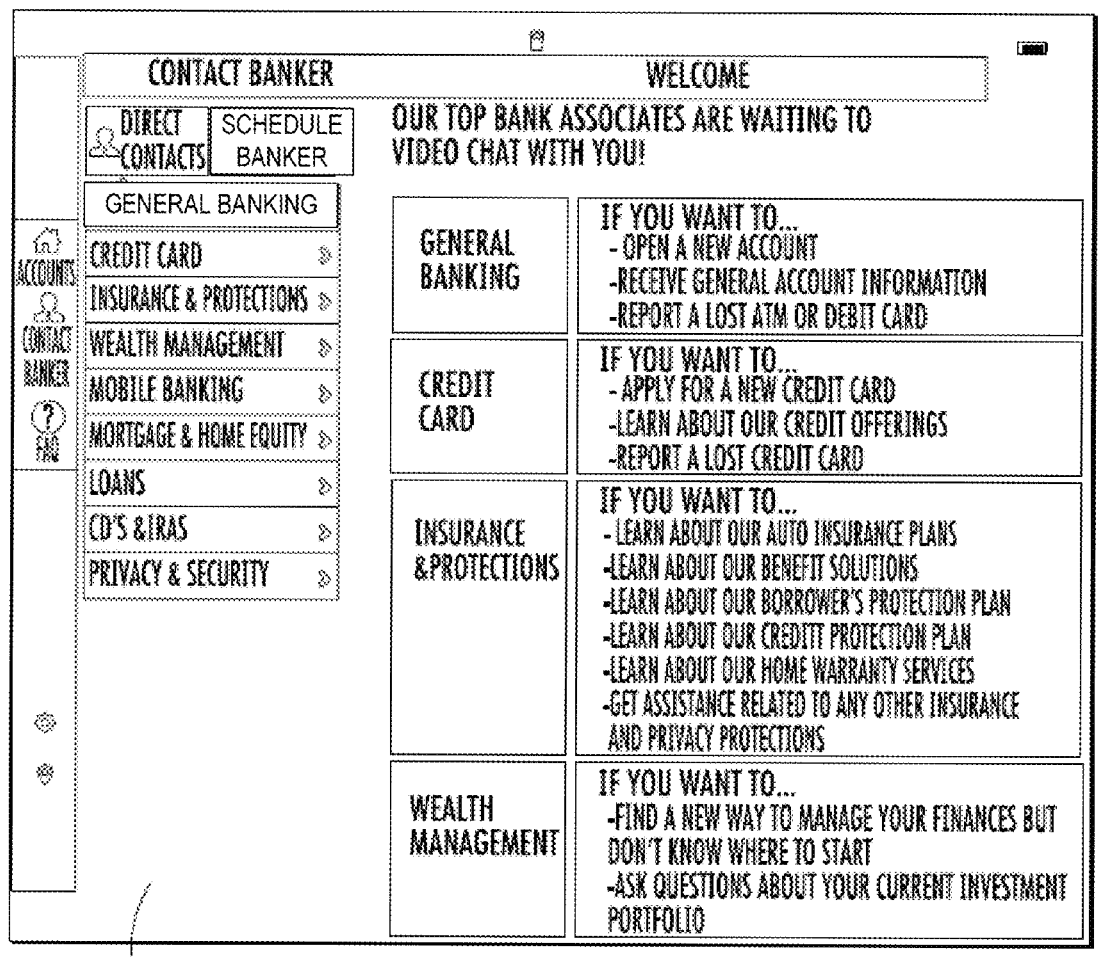
Figure 12:
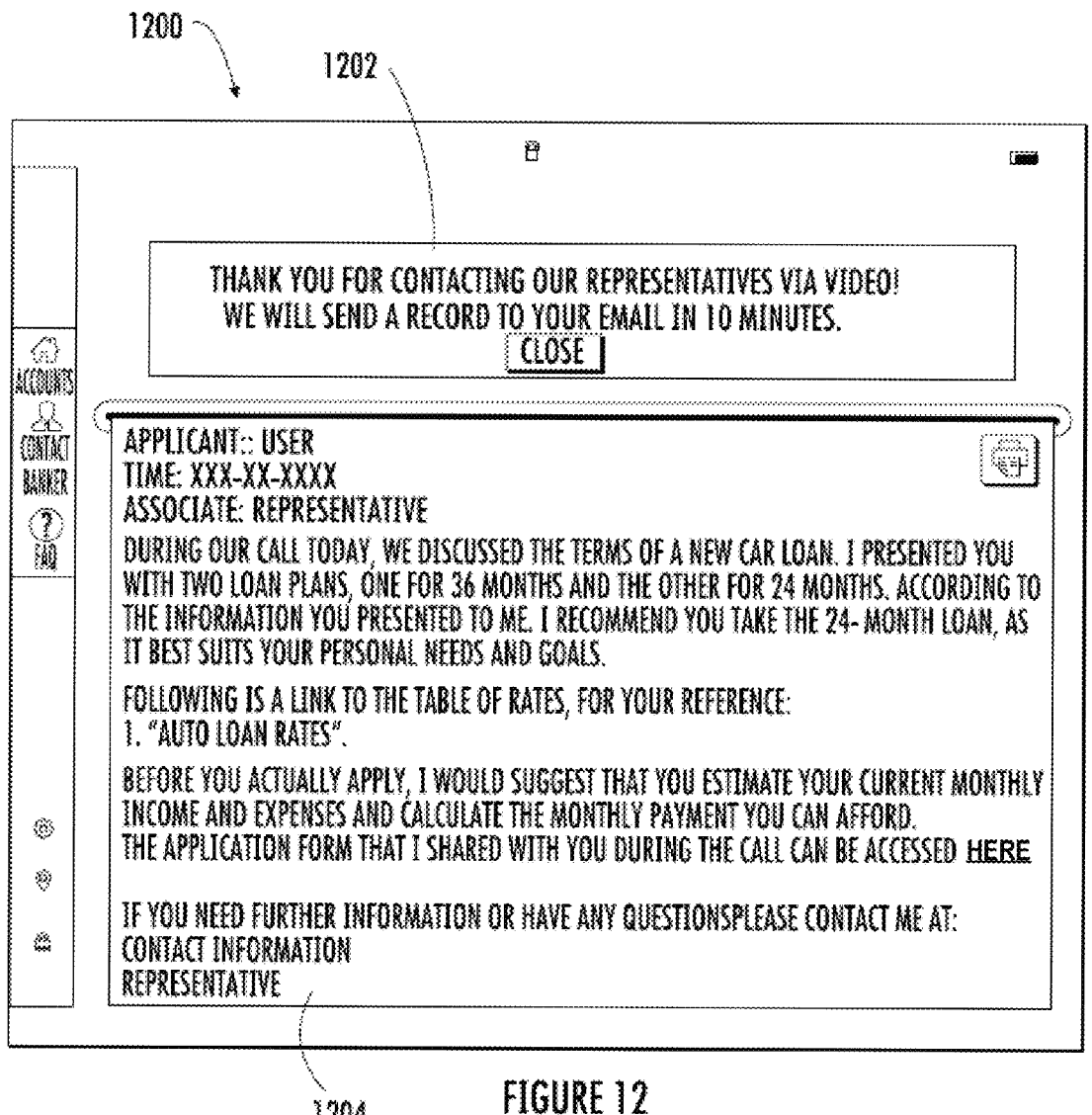
Figure 13:
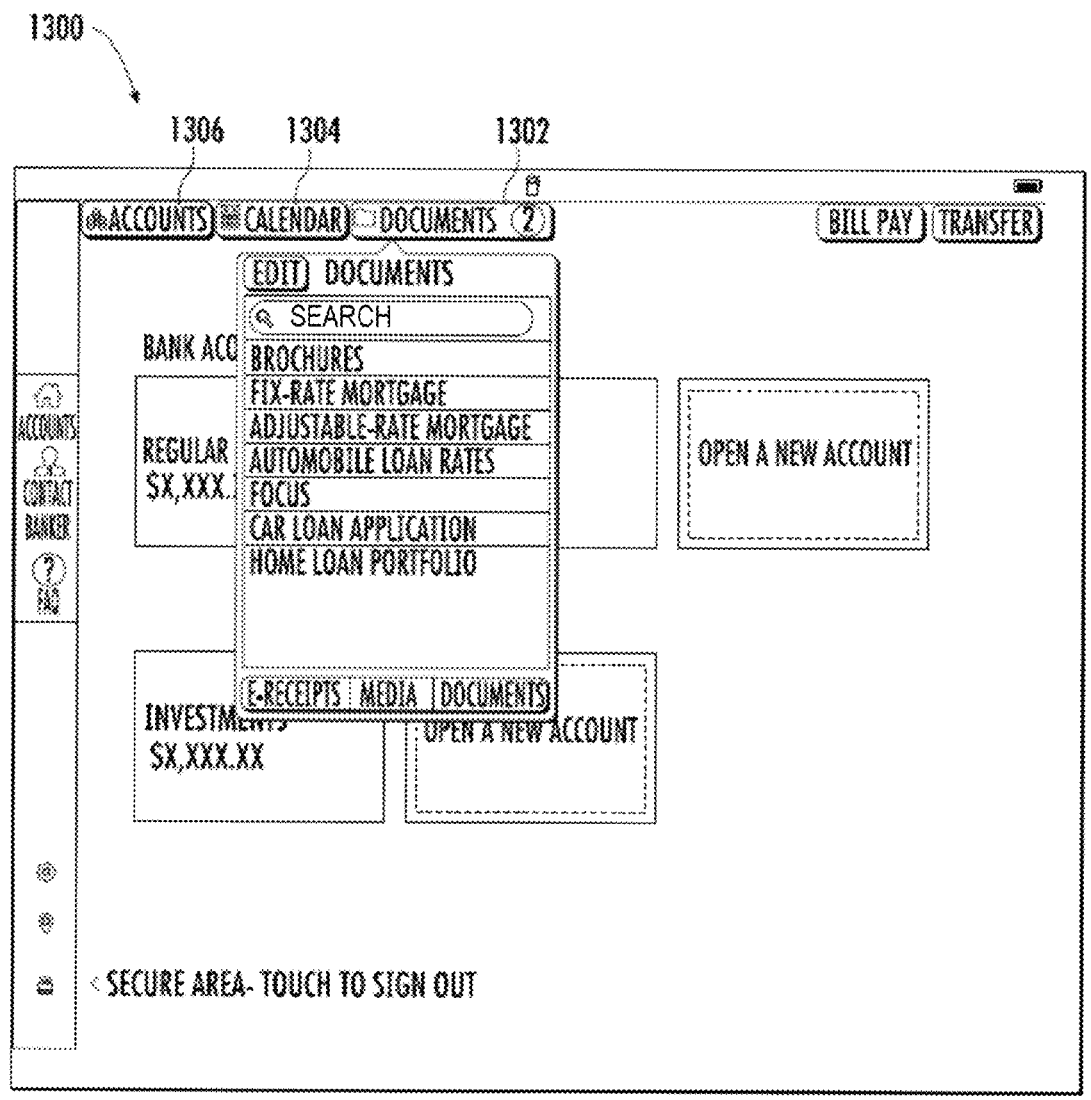

Referring now to FIGS. 7-13, exemplary user interfaces and screenshots for implementing a system for providing an interactive conference and a record thereof are provided, in accordance with embodiments of the present invention. In one embodiment, the system determines that an operative connection is being or has been established between a user device of a user and a system associated with a representative of a financial institution, such that the user and the representative may conduct or are conducting a video conference. Once the operative connection is established, the user may be connected to the representative in the video conference (FIG. 7). The user and the representative may share and discuss documents such as car loan documents and rates (FIG. 8). The user and the representative may share and discuss documents, including account registers such as for checking accounts (FIG. 9). In some embodiments, an additional participant may be brought onto the conference (FIG. 10). The system may display a temporary or persistent interactive control or navigation guide, such as a sidebar (FIG. 11). When the conference is completed, the system may store and/or send a record to the user (FIG. 12). In still further embodiments, the user may access records and documents associated with conferences and made available by the system (FIG. 13). It should be understood that the display choices, content, and order of the screens are merely exemplary.

Turning now to FIG. 7, a screenshot 700 of an exemplary video conference is provided, in accordance with one embodiment of the invention. In the screenshot 700, the representative 204 is provided in a large screen 702. The user 202 is also depicted in a small screen 704. Biographic or professional information of the representative 204 may be provided in an information box 706. A control bar 708 for controlling the conference may also be provided. For example, the control bar 708 may include options to minimize 710 the screen 702, mute the conference 712, record the conference 714, or end the conference 716. While the conference as depicted indicates that the representative is in the large screen and the user is in the small screen, it should be understood that the screens may be resized or even hidden at the desire of the viewer.

In FIG. 8, a screenshot 800 of an exemplary video conference where the user and the representative are viewing the same document is provided, in accordance with one embodiment of the invention. In the screenshot 800, the user 202 and the representative 204 are viewing the same document 802, here a term sheet for car loan interest rates based on the type of purchase and the length of the loan. Again, the control bar 708 is present.

In FIG. 9, a screenshot 900 of an exemplary video conference where the user and the representative are viewing the same account register is provided, in accordance with one embodiment of the invention. In the screenshot 900, the user 202 and the representative 204 are viewing an account register 902, which is a type of document. Also, the screenshot 900 depicts how information may be linked to the document in the conference. For example, details of a transaction may be provided in a callout box 904 when the user and/or the representative selects a transaction.

Turning now to FIG. 10, an exemplary screenshot 1000 is provided that depicts that additional parties, such as a second representative 205 may be included on the conference along with the user 202 and the representative 204.

In FIG. 11, an exemplary sidebar 1100 that depicts how the user may control the conference is provided. The sidebar may include tabs that separate account information from conferencing links and Frequently Asked Questions documents. In another embodiment, the sidebar may vary based on the stage of the conference. In this example, the conference has not yet started and thus the sidebar provides options for the user to select from for targeting the conference to a set of representatives that are most able to assist the user. These tabs provide a visual navigation aid that allows users to quickly and easily navigate to the appropriate groups within the financial institution. The visual navigation aid provides an intuitive system for customers to locate the department relevant to their call. In some embodiments, the visual navigation aid is customized for the user. For example, if a user is logged into a user account on the financial institution webpage, the user may be presented groups within the financial institution that apply to a user account or which are open to new accounts. In this example, if a user has sufficient funds in an account to qualify for a premier account or premier representative, then a tab depicting the premier services may appear in the sidebar or visual navigation aid.

In an embodiment, the visual navigation aid or visual call navigation also provides for video communication between the user and the representative. In some embodiments, the user and the representative can send video recordings to each other. For example, the representative may determine during a conference that a user would benefit from a video tutorial on dollar cost averaging. The representative may have a bank or library of videos explaining various topics and be able to send the user the video or a link to the video explaining the subject matter. In an embodiment, this "async" video communication, as opposed to synced video communication during video conferencing, provides an additional service to customers when the representative wants to explain something that requires no interaction (e.g., "this is how you fill this form"). In a further embodiment, the async video communication also assists representatives and users in maintaining a personal connection. For example, the representative may send the user a birthday message on the user's birthday. It should be understood that while the examples disclosed herein are directed to the representative sending the user videos, users may also send representatives videos without conducting conferences.

In FIG. 12, an exemplary screenshot 1200 is provided that depicts the conclusion of the conference. In an embodiment, the system provides a message 1202 to the user, such as a thank you for participating in the conference and an acknowledgment that the conference is ended. The system may also include instructions 1204 in how the user may receive a record of the conference.

Turning to FIG. 13, an exemplary screenshot 1300 is provided that depicts storage of the records of the conferences in association with the system. The user may access the records or blank documents by selecting a drop down menu associated with documents 1302. In some embodiments, the user accesses documents by accessing a calendar 1304, which may have records stored or accessible by date of conference. Still further, the user may access documents by accessing accounts 1306, which may have records associated with conferences associated with each specific account.

In summary, embodiments of the invention are directed to systems, methods and computer program products for providing an interactive conference. Further embodiments of the invention are directed to systems, methods and computer program products for providing a record of an interactive conference.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

U.S. application Ser. No. 13/651,966, entitled SYSTEM PROVIDING AN INTERACTIVE CONFERENCE filed Oct. 15, 2012 to Matt Calman et al.;

U.S. application Ser. No. 13/651,798, entitled ADAPTIVE SCAFFOLDING OF LEVELS OF CONNECTIVITY DURING A CONFERENCE, filed Oct. 15, 2012 to Matt Calman et al.;

U.S. application Ser. No. 13/651,674, entitled FUNCTIONALITY DURING A HOLD PERIOD PRIOR TO A CUSTOMER SERVICE VIDEO CONFERENCE filed Oct. 15, 2012 to Matt Calman et al.;

U.S. application Ser. No. 13/651,970, entitled SPLIT-SCREEN PRESENTATION OF FUNCTIONALITY DURING A HOLD PERIOD PRIOR TO A CUSTOMER SERVICE VIDEO CONFERENCE, filed Oct. 15, 2012 to Matt Calman et al.;

U.S. application Ser. No. 13/652,326, entitled MULTIPLE-PARTICIPANT CUSTOMER SERVICE CONFERENCE, filed Oct. 15, 2012 to Matt Calman et al.;

U.S. application Ser. No. 13/652,093, entitled REPRESENTATIVE SELECTION FOR CUSTOMER SERVICE CONFERENCE, filed Oct. 15, 2012 to Matt Calman et al.; and U.S. application Ser. No. 13/652,175, entitled REPRESENTATIVE PRE-SELECTION FOR CUSTOMER SERVICE CONFERENCE, filed Oct. 15, 2012 to Matt Calman et al.

What is claimed is:

1. A system for providing a record of an interactive conference, the system comprising:
   a memory;
   a processor; and
   a computing module stored in the memory, executable by the processor, and configured to cause the processor to:
      determine that a first operative connection has been established between a first user device of a first user and a system associated with a representative of a financial institution, such that the first user and the representative are conducting a conference;
      enable the first user to modify a connectivity of the conference, wherein modifying the connectivity of the conference comprises:
         receiving a selection of a second user device from the first user, wherein the second user device is configured to enable a second user to interact with the representative; and
         receiving an indication from the first user, via the first user device, to initiate a dual-channel connectivity of the conference using the first user device and the second user device;
      establish a second operative connection between the second user device and the system based on a determination that the second user device has a predetermined level of enhanced security;
      modify the connectivity of the conference based on the received indication from the first user to initiate the dual-channel connectivity of the conference;
      identify a document referenced during the conference, wherein the document is not in a searchable or editable format;

capture at least a portion of the conference as an audio record;

transcribe the audio record into a searchable audio text transcription, wherein the audio text transcription is stored in a conference record;

convert text of the document into a searchable and editable format using an optical character recognition process and store the converted text of the document in the conference record;

receive, during the conference, from one of the first device, the second device, or the system associated with the representative, a highlighting tag comprising a start time and an end time within a duration of the conference, wherein the highlighting tag comprises an indication of an important segment of the conference;

identify a highlighted section of the audio text transcription associated with the start time and the end time of the highlighting tag and store the highlighted section of the audio text transcription in the conference record;

identify a highlighted section of the document associated with the start time and the end time of the highlighting tag and store the highlighted section of the document in the conference record;

prompt a user interface of the first user device to display the converted text of the document and the searchable audio text transcription;

prompt a user interface of the second user device to display the converted text of the document and the searchable audio text transcription;

receive a first edit to the searchable audio text transcription from the first user or the second user;

receive a second edit to the converted text of the document from the first user or the second user;

associate the first edit with the searchable audio text transcription to create an edited audio text transcription;

associate the second edit with the converted text of the document to create an edited document;

store the edited document and the edited audio text transcription in the conference record; and provide a summary of the conference to the first user device and the second user device, wherein the summary of the conference comprises at least the conference record.

2. The system of claim 1, wherein the computing module is further configured to cause the computer processor to apply the first edit and the second edit to all existing copies of the conference record.

3. The system of claim 1, wherein the first edit and the second edit are selected from a group consisting of an annotation, a voice note, a text note, a tag, and a link.

4. A computer implemented method for providing a record of an interactive conference, the method comprising:

utilizing a processor for executing computer program code stored in a non-transitory computer-readable medium to cause the processor to:

determine that a first operative connection has been established between a first user device of a first user and a system associated with a representative of a financial institution, such that the first user and the representative are conducting a conference;

enable the first user to modify a connectivity of the conference, wherein modifying the connectivity of the conference comprises:

receiving a selection of a second user device from the first user, wherein the second user device is configured to enable a second user to interact with the representative; and receiving an indication from the first user, via the first user device, to initiate a dual-channel connectivity of the conference using the first user device and the second user device;

establish a second operative connection between the second user device and the system based on a determination that the second user device has a predetermined level of enhanced security;

identify a document referenced during the conference, wherein the document is not in a searchable or editable format;

capture at least a portion of the conference as an audio record;

transcribe the audio record into a searchable audio text transcription, wherein the audio text transcription is stored in a conference record;

convert text of the document into a searchable and editable format using an optical character recognition process and store the converted text of the document in the conference record;

receive, during the conference, from one of the first device, the second device, or the system associated with the representative, a highlighting tag comprising a start time and an end time within a duration of the conference, wherein the highlighting tag comprises an indication of an important segment of the conference;

identify a highlighted section of the audio text transcription associated with the start time and the end time of the highlighting tag and store the highlighted section of the audio text transcription in the conference record;

identify a highlighted section of the document associated with the start time and the end time of the highlighting tag and store the highlighted section of the document in the conference record;

prompt a user interface of the first user device and to display the converted text document and the searchable audio text transcription;

prompt a user interface of the second user device to display the converted text of the document and the searchable audio text transcription;

receive a first edit to the searchable audio text transcription from the first user or the second user;

receive a second edit to the converted text of the document from the first user or the second user;

associate the first edit with the searchable audio text transcription to create an edited audio text transcription;

associate the second edit with the converted text of the document to create an edited document store the edited text of the document and the edited audio text transcription in the conference record; and provide a summary of the conference to the first user device and the second user device, wherein the summary of the conference comprises at least the conference record.

5. The computer implemented method of claim 4, wherein the computer program code is further configured to cause the processor to apply the first edit and the second edit to all existing copies of the conference record.

6. The computer implemented method of claim 4, wherein the first edit and the second edit are selected from a group consisting of an annotation, a voice note, a text note, a tag, and a link.

7. A computer program product for providing a record of an interactive conference, the computer program product comprising:
a non-transitory computer-readable medium storing instructions that when executed by a computer performs the following steps:
determine that a first operative connection has been established between a first user device of a first user and a system associated with a representative of a financial institution, such that the first user and the representative are conducting a conference;
enable the first user to modify a connectivity of the conference, wherein modifying the connectivity of the conference comprises:
receiving a selection of a second user device from the first user, wherein the second user device is configured to enable a second user to interact with the representative; and
receiving an indication from the first user, via the first user device, to initiate a dual-channel connectivity of the conference using the first user device and the second user device;
establish a second operative connection between the second user device and the system based on a determination that the second user device has a predetermined level of enhanced security;
identify a document referenced during the conference, wherein the document is not in a searchable or editable format;
capture at least a portion of the conference as an audio record;
transcribe the audio record into a searchable audio text transcription, wherein the audio text transcription is stored in a conference record;
convert text of the document into a searchable and editable format using an optical character recognition process and store the converted text of the document in the conference record;
receive, during the conference, from one of the first device, the second device, or the system associated with the representative, a highlighting tag comprising a start time and an end time within a duration of the conference, wherein the highlighting tag comprises an indication of an important segment of the conference;
identify a highlighted section of the audio text transcription associated with the start time and the end time of the highlighting tag and store the highlighted section of the audio text transcription in the conference record;
identify a highlighted section of the document associated with the start time and the end time of the highlighting tag and store the highlighted section of the document in the conference record;
prompt a user interface of the first user device and to display the converted text document and the searchable audio text transcription;
prompt a user interface of the second user device to display the converted text of the document and the searchable audio text transcription;
receive a first edit to the searchable audio text transcription from the first user or the second user;
receive a second edit to the converted text of the document from the first user or the second user;
associate the first edit with the searchable audio text transcription to create an edited audio text transcription;
associate the second edit with the converted text of the document to create an edited document store the edited text of the document and the edited audio text transcription in the conference record; and
provide a summary of the conference to the first user device and the second user device, wherein the summary of the conference comprises at least the conference record.

8. The computer program product of claim 7, wherein the non-transitory computer-readable medium further comprises instructions for causing the computer to perform the step of applying the first edit and the second edit to conference the record to all existing copies of the conference record.

9. The computer program product of claim 7, wherein the first edit is an annotation.

10. The computer program product of claim 7, wherein the first edit is a voice note.

11. The computer program product of claim 7, wherein the first edit is a text note.

12. The computer program product of claim 7, wherein the first edit is a tag, and a link.

13. The computer program product of claim 7, wherein the first edit is a link.

14. The computer program product of claim 7, wherein the second edit is an annotation.

15. The computer program product of claim 7, wherein the second edit is a voice note.

16. The computer program product of claim 7, wherein the second edit is a text note.

17. The computer program product of claim 7, wherein the second edit is a tag.

18. The computer program product of claim 7, wherein the second edit is a link.

* * * * *